US008963828B2

(12) United States Patent
Izumi

(10) Patent No.: US 8,963,828 B2
(45) Date of Patent: Feb. 24, 2015

(54) INFORMATION INPUTTING DEVICE, INFORMATION OUTPUTTING DEVICE AND METHOD

(75) Inventor: Kenji Izumi, Matsue (JP)

(73) Assignee: Shimane Prefectural Government, Matsue-shi (JP)

( * ) Notice: Subject to any disclaimer, the term of this patent is extended or adjusted under 35 U.S.C. 154(b) by 443 days.

(21) Appl. No.: 12/451,846

(22) PCT Filed: Jun. 3, 2008

(86) PCT No.: PCT/JP2008/060215
§ 371 (c)(1),
(2), (4) Date: Dec. 3, 2009

(87) PCT Pub. No.: WO2008/149860
PCT Pub. Date: Dec. 11, 2008

(65) Prior Publication Data
US 2010/0103093 A1    Apr. 29, 2010

(30) Foreign Application Priority Data

Jun. 4, 2007 (JP) ................. 2007-148640
Jul. 12, 2007 (JP) ................. 2007-183590
Nov. 19, 2007 (JP) ................. 2007-299752

(51) Int. Cl.
*G09G 5/00*     (2006.01)
*G06F 3/041*    (2006.01)
*G06F 3/033*    (2013.01)
(52) U.S. Cl.
CPC ................... *G06F 3/0334* (2013.01)
USPC .......................... 345/156; 345/173

(58) Field of Classification Search
USPC .......................... 345/156–158, 168, 173–177
See application file for complete search history.

(56) References Cited

U.S. PATENT DOCUMENTS

| 5,436,639 A | 7/1995 | Arai et al. |
| 5,838,965 A * | 11/1998 | Kavanagh et al. ............ 1/1 |
| 7,173,605 B2 * | 2/2007 | Fong et al. ............ 345/168 |

(Continued)

FOREIGN PATENT DOCUMENTS

| JP | A-7-84715 | 3/1995 |
| JP | A-2000-298544 | 10/2000 |
| JP | A-2001-38051 | 2/2001 |

(Continued)

OTHER PUBLICATIONS

International Search Report issued in International Application No. PCT/JP2008/060215; Mailed Sep. 9, 2008.

(Continued)

*Primary Examiner* — Kenneth Bukowski
(74) *Attorney, Agent, or Firm* — Oliff PLC

(57) ABSTRACT

Two bar support portions are provided on opposite sides of a floor mat sensor and a horizontal bar is fixed between these portions to define spaces below into which feet are to be inserted. Then, using the horizontal bar as a reference, an input area, such as "A" or "B", can be accurately stepped on. A signal receiver reads and stores a first signal, and a signal determination unit determines whether the signal that was read was generated by stepping on area A or area B. Thereafter, when a signal is received indicating a data type was received first, the signal receiver reads the next input signal and the signal determination unit determines whether a signal indicating the data type was received.

17 Claims, 23 Drawing Sheets

SIDE VIEW

(56) References Cited

U.S. PATENT DOCUMENTS

2002/0022518 A1* 2/2002 Okuda et al. ............... 463/36
2008/0106441 A1* 5/2008 Chiang ...................... 341/22

FOREIGN PATENT DOCUMENTS

| JP | A-2002-273038 | | 9/2002 |
|---|---|---|---|
| JP | 2003/066829 | * | 3/2003 |
| JP | A-2003-111867 | | 4/2003 |
| JP | A-2004-105220 | | 4/2004 |
| JP | A-2005-164448 | | 6/2005 |
| JP | A-2007-012034 | | 1/2007 |

OTHER PUBLICATIONS

Jan. 21, 2010 Translation of the International Preliminary Report on Patentability issued in International Application No. PCT/JP2008/060215.

* cited by examiner

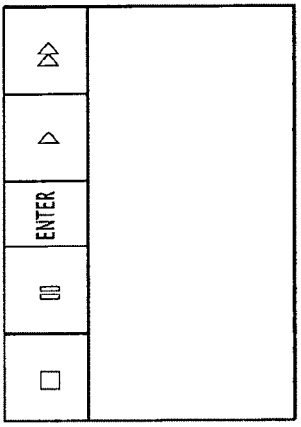
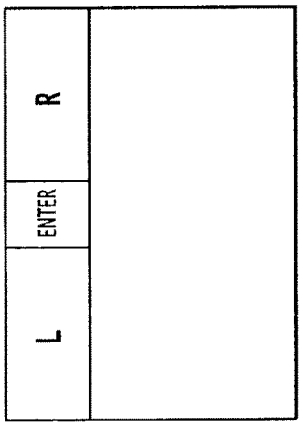
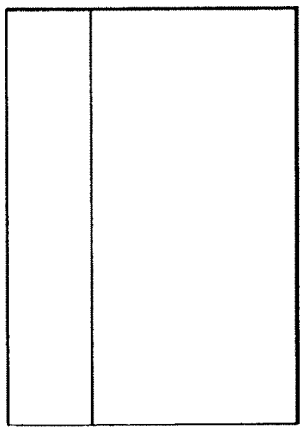
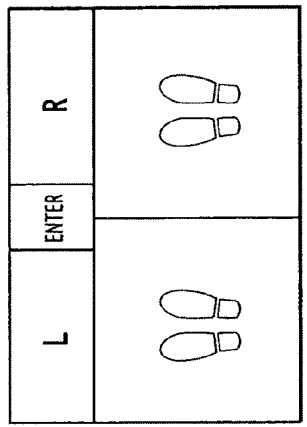
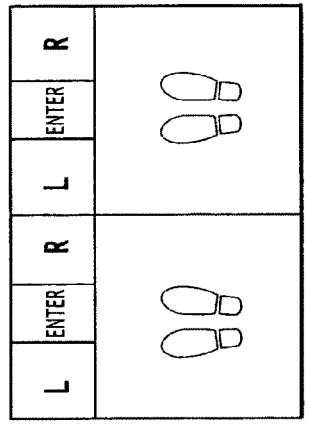
FIG.15A EXAMPLE FOR NO PROJECTION (EMPLOY PLAIN WHITE MAT OR MATERIAL WITH HIGH REFLECTIVITY)
FIG.15B BASIC EXAMPLE AT START
FIG.15C VIDEO CONTENT EXAMPLE
FIG.15D EXAMPLE TOP, BOTTOM, RIGHT AND LEFT MOVE MENU
FIG.15E MULTI-USER EXAMPLE – 1
FIG.15F MULTI-USE EXAMPLE – 2

US 8,963,828 B2

INFORMATION INPUTTING DEVICE, INFORMATION OUTPUTTING DEVICE AND METHOD

TECHNICAL FIELD

The present invention relates to a data input apparatus, a data output apparatus and a data output method, and more particularly, relates to a data input apparatus, a data output apparatus and a data output method, according to which data can be entered to a computer using a device other than an ordinary input device, such as a keyboard.

BACKGROUND ART

In recent years, a variety of data input methods have been proposed not only for game machines but also for computers in order to increase user-friendliness or entertaining. Especially, various types of apparatuses have been proposed wherein pressure detection sensors are provided for floor mats, etc., and when pressure is applied to a floor mat, for example, when stepped on, a variety of data are generated and are employed for computer processing. As one system that employs such an apparatus, a stepping mat toy has been proposed that permits players to enjoy games by themselves, or to engage in games with their friends, and that also contributes to the development of children's vision and hearing senses, their memory powers and their physical strength (see, for example, patent document 1). Furthermore, there is a foot operated type input system, which takes the place of a mouse, whereby a cursor movement function, normally provided by the mouse, is performed using a radio signal that does not impose a load on the feet and the body of a player, and that can also improve the operating efficiency of a computer (see, for example, patent document 2).

Further, various types of floor mat sensors have been proposed, and recently, a pressure detector has been proposed that employs electrostatic coupling and can precisely measure an applied pressure, that is resistant to noise and that can be used in any kind of location (see, for example, patent document 3).

Further, a game or training machine, provided with a handrail for supporting a person's body or for preventing a fall, has been proposed (see, for example, patent document 4).

A conventional output apparatus or method employs various methods and systems to detect or control the movement of feet. However, in any case, areas for outputting desired data are clearly indicated, for example, by printing frames on a floor mat, and the visual checking of the position of an area is required when it is pressed by the foot. Therefore, a problem is that when an area is stepped on without its position being identified, another area might be pressed and data differing from those desired would be output. As a result, a visual check is required each time to prevent incorrect data from being output through an erroneous operation, and a man-machine interface is degraded, instead of being improved. A conventional example is one that provides a handrail; however, the purpose of this handrail is merely to prevent falling, for example, and is not provided to simplify an operation, or to ensure the performance of a reliable operation.

Another problem is that, since a floor mat sensor pattern is generally printed on a mat, for example, the floor mat sensor pattern can not be variously changed, and the contents are limited.

While taking these problems into account, one objective of the present invention is to provide a data input apparatus that limits the movement of feet and provides a predetermined reference for an operating position when a floor mat sensor is employed to output different data based on a portion the foot touches, so that an erroneous data entry for a predesignated area seldom occurs, even when the position of the predesignated area is not visually identified in each instance.

It is another objective of the present invention to provide a data output apparatus and a data output method whereby, when a floor mat sensor is employed to output different data based on the portion of the mat the foot touches, one set of data is specified and output by multiple movements of the feet, so that an erroneous data entry seldom occurs when the feet are used.

Patent Document 1: Japanese Patent Laid-Open No. 2002-273038
Patent Document 2: Japanese Patent Laid-Open No. 2007-12034
Patent Document 3: Japanese Patent Laid-Open No. 2005-164448
Patent Document 4: Japanese Patent Laid-Open No. 2004-105220

DISCLOSURE OF THE INVENTION

To achieve these objectives, the present invention according to claim 1 is a data input apparatus that outputs data employing a floor mat sensor that generates different signals based on a position where a foot is placed, characterized by comprising:
foot movement limitation means, provided above the floor mat sensor to limit foot movements; and
data output means for receiving a signal indicating that a foot has been placed in a predetermined area on the floor mat sensor, and for outputting predesignated data in correlation with the predetermined area.

The present invention according to claim 2 is the data input apparatus for claim 1, characterized in that: the foot movement limitation means defines an area on the floor mat sensor that limits a movement of a body of an operator; and when a foot is placed in the area for which movement is limited, a pattern used to identify areas for the output of different data are output is presented on the floor mat sensor.

The present invention according to claim 3 is the data input apparatus for claim 2, characterized by further comprising:
pattern change means for changing a pattern to identify areas for the output of different data.

The present invention according to claim 4 is the data input apparatus for claim 3, characterized in that the pattern change means includes identification pattern projection means for projecting, from above, on the floor mat sensor, a pattern used to identify the areas for the output of different data.

The present invention according to claim 5 is the data input apparatus for one of claims 2 to 4, characterized in that the foot movement limitation means has a space, relative to the floor mat sensor, where one part of the foot moves to the area for which movement is limited.

The present invention according to claim 6 is the data input apparatus for claim 5, characterized in that the foot movement limitation means is a bar that is horizontally arranged at a predetermined height above the floor mat sensor.

The present invention according to claim 7 is the data input apparatus for claim 6, characterized by further comprising:
bar support means, for supporting the bar horizontally;
wherein the identification pattern projection means is mounted on the bar support means.

The present invention according to claim 8 is the data input apparatus for claim 6 or 7, characterized in that a boundary of the predetermined area is located near a position on the floor mat sensor where the horizontally arranged bar is projected.

The present invention according to claim 9 is the data input apparatus for one of claims 6 to 8, characterized in that the predetermined height is an arbitrary position between the knees and the chest of a standard figure.

The present invention according to claim 10 is the data input apparatus for one of claims 6 to 9, characterized in that the foot movement limitation means has a braille portion or a raised and recessed portion to indicate the position of an input area designated on the floor mat sensor.

The present invention according to claim 11 is a data output method for outputting data by employing a floor mat sensor that generates different signals based on which portions are pressed by feet, characterized by comprising:

a reception step of successively receiving, from the floor mat sensor, twice or more, a signal generated by applying pressure using the feet; and an output step of outputting data that is pre-allocated in correlation with the reception order and a combination for signals that were received twice or more.

The present invention according to claim 12 is the data output method for claim 11, characterized in that:

when a signal indicating a data type has been received, and thereafter, a signal indicating data confirmation, which differs from a signal indicating a data type, is received, data that was received as pre-allocated data and that is indicated by the data type is output at the output step.

The present invention according to claim 13 is the data output method for claim 12, characterized in that the floor mat sensor includes two or more data input areas for generating signals indicating different data types, and the confirmation area for generating a signal indicating data confirmation.

The present invention according to claim 14 is the data output method for claim 13, characterized in that the confirmation area is located between the two or more data input areas.

The present invention according to claim 15 is a data output apparatus, characterized by comprising:

a floor mat sensor, for generating different signals based on which portions are pressed by feet;

receiving means for successively receiving, from the floor mat sensor, a signal generated by applying a pressure using the feet; and output means for outputting data that is pre-allocated in correlation with the reception order and a combination for signals that were received twice or more.

The present invention according to claim 16 is the data output apparatus for claim 15, characterized in that when the output means receives a signal indicating a data type and then receives a signal indicating data confirmation, which differs from a signal indicating a data type, the output means outputs data that was received as pre-allocated data and that is indicated by a data type.

The present invention according to claim 17 is the data output apparatus for claim 16, characterized in that the floor mat sensor includes two or more data input areas for generating signals indicating different data types, and a confirmation area for generating a signal indicating data confirmation.

The present invention according to claim 18 is the data output apparatus for claim 17, characterized in that the confirmation area is located between the two or more data input areas.

BRIEF DESCRIPTION OF THE DRAWINGS

FIG. 15A is a diagram showing an example projected pattern for the floor mat sensor according to the embodiment of the present invention;

FIG. 15B is a diagram showing an example projected pattern for the floor mat sensor according to the embodiment of the present invention;

FIG. 15C is a diagram showing an example projected pattern for the floor mat sensor according to the embodiment of the present invention;

FIG. 15D is a diagram showing an example projected pattern for the floor mat sensor according to the embodiment of the present invention;

FIG. 15E is a diagram showing an example projected pattern for the floor mat sensor according to the embodiment of the present invention;

FIG. 15F is a diagram showing an example projected pattern for the floor mat sensor according to the embodiment of the present invention;

BEST MODE FOR CARRYING OUT THE INVENTION

The embodiments of the present invention will now be described in detail while referring to drawings.

First Embodiment

Figure 1:
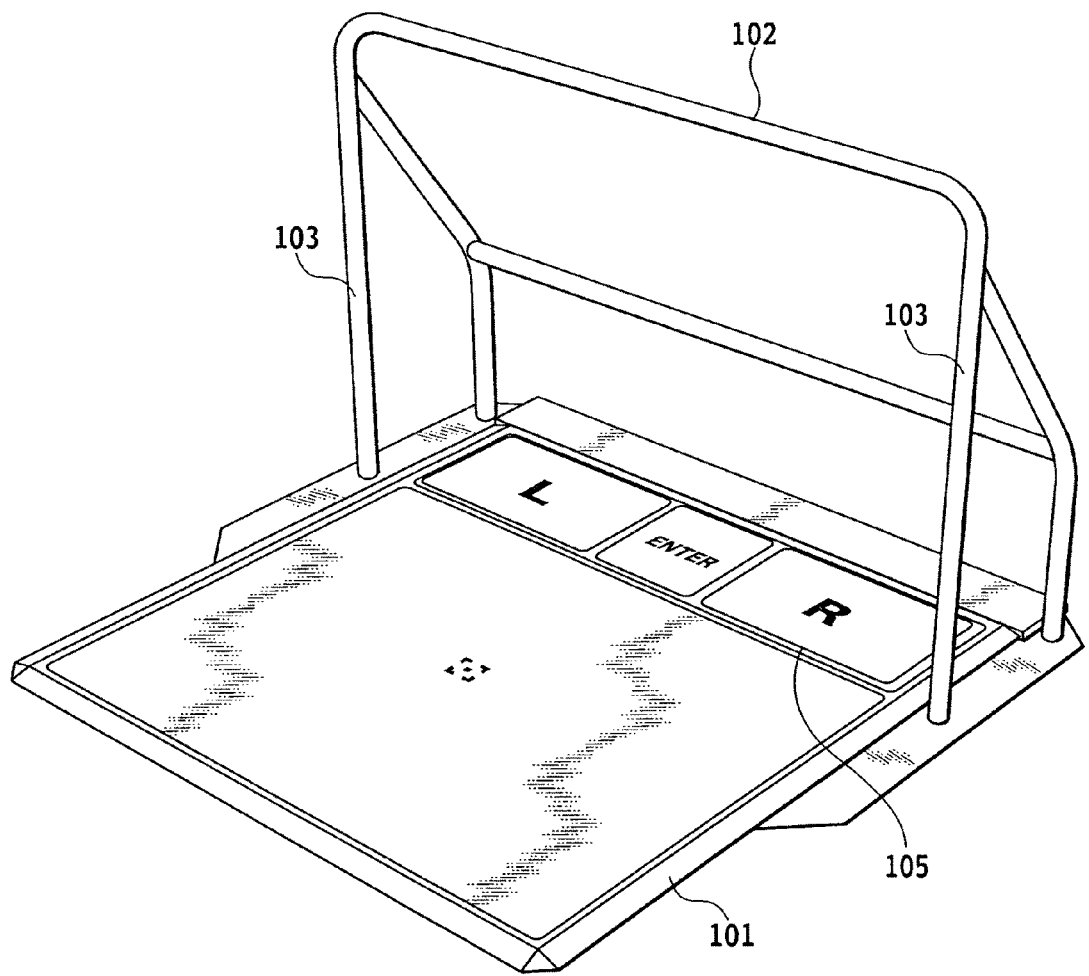
FIG. 1 is a diagram illustrating an example data input apparatus having a horizontal bar according to one embodiment of the present invention.

FIG. 1 is a diagram illustrating an example data input apparatus with a horizontal bar according to one embodiment of the present invention. A data input apparatus 101 in this embodiment includes a horizontal bar 102, bar support portions 103, which support the horizontal bar 102, and a floor mat sensor 104, provided for the obverse surface of the main body, and outputs data in correlation with the position of a specific area of the floor mat that is stepped on. As will be described later, the horizontal bar 102 is used as a support for an operator when moving his or her feet, and for limiting the shifting range for the body of the operator, so as to restrict the movement of the feet and to ensure that the entry of data, using the feet, is enabled.

Figure 5:
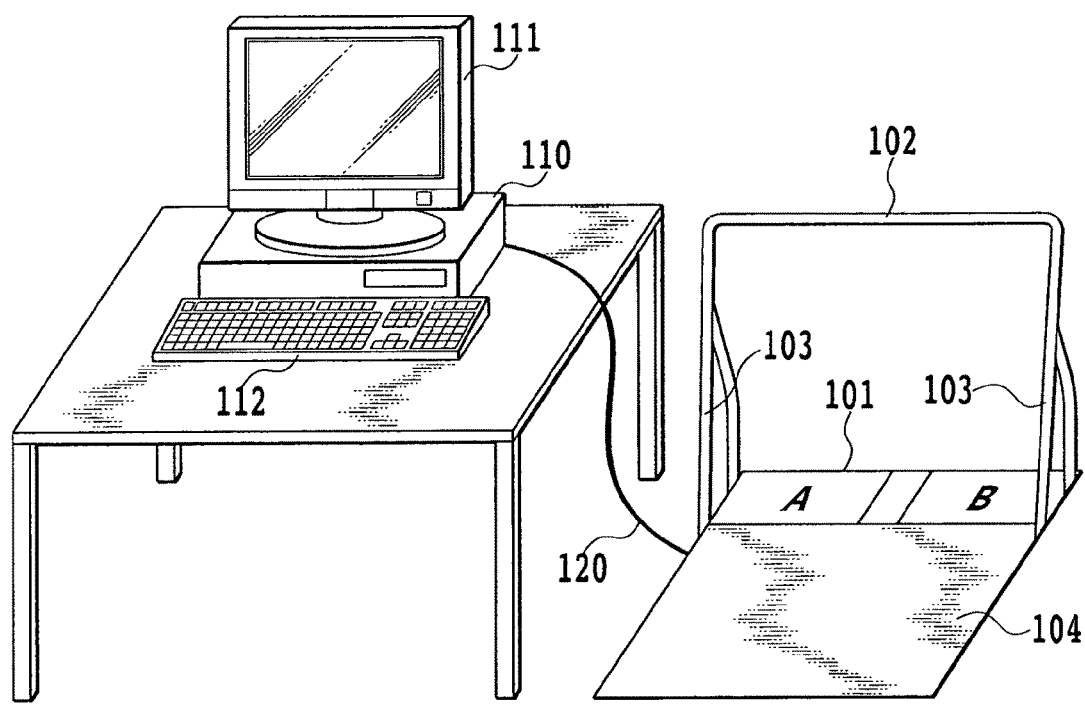
FIG. 5 is a diagram illustrating the general structure of a system according to the embodiment of the present invention.

FIG. 5 is a diagram illustrating the general structure of a system according to the embodiment of the present invention. The data input apparatus 101 of this embodiment is generally connected to a computer 110, and serves as one type of data input apparatus. Referring to FIG. 5, data output by the data input apparatus 101 is transmitted to the computer 110 via a cable 120, for example, and the received data can then be employed by the computer 110 for various processes. As an example, when a keyboard 112 is not available, two choices may be displayed on a display 111, and to select the desired choice, an operator steps on a predetermined portion of the data input apparatus 101.

Figure 2:
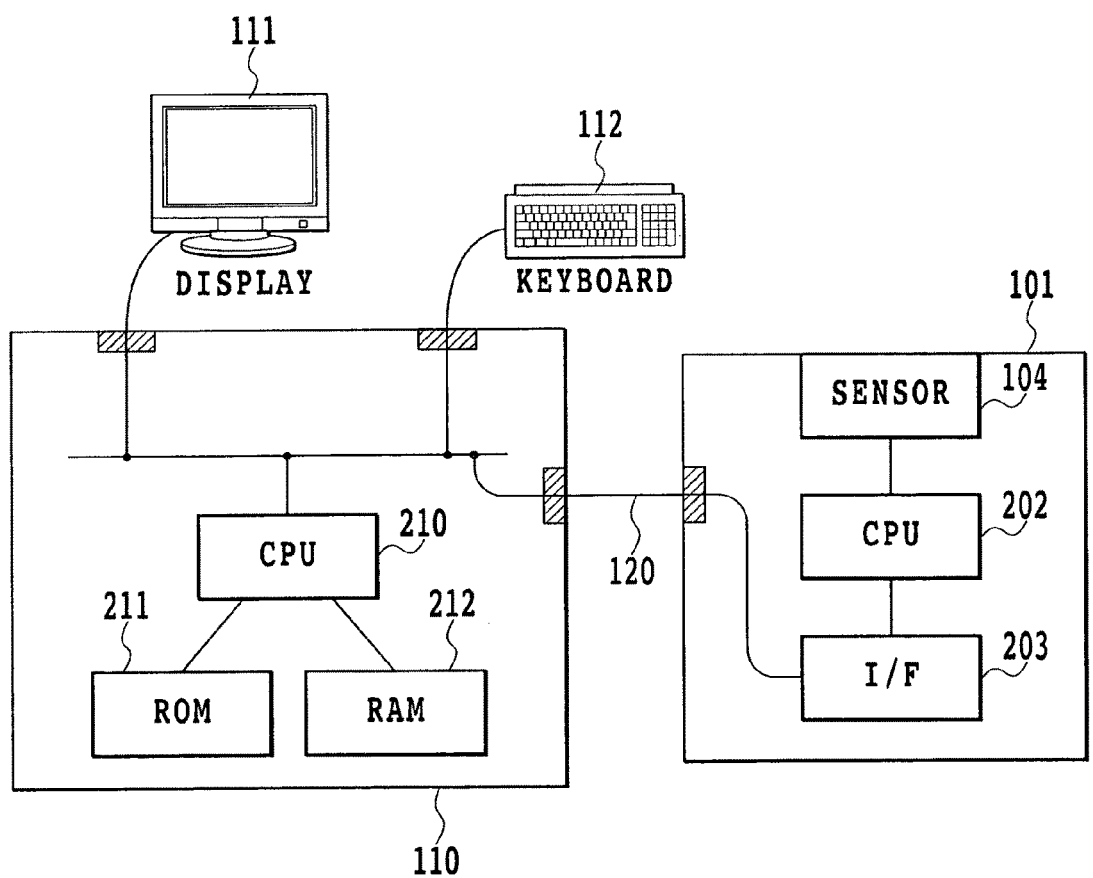
FIG. 2 is a schematic block diagram illustrating the arrangement for a data input apparatus 101 and a computer 110 according to the embodiment.
Figure 7:
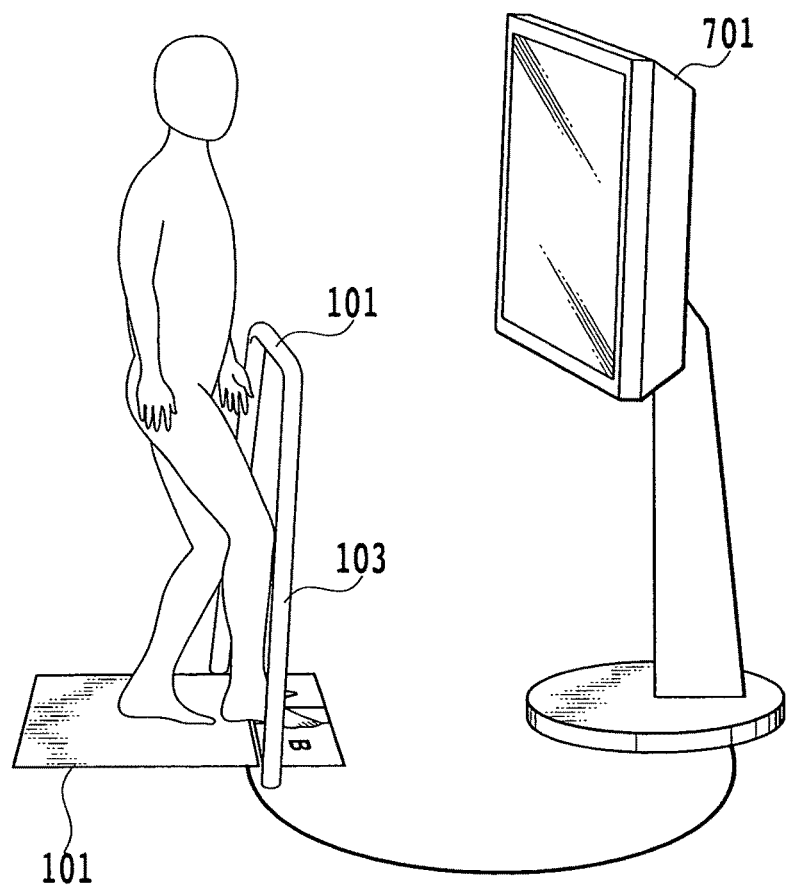
FIG. 7 is a diagram for explaining the state of the embodiment of the present invention wherein the floor mat sensor is pressed by a foot.
Figure 10:
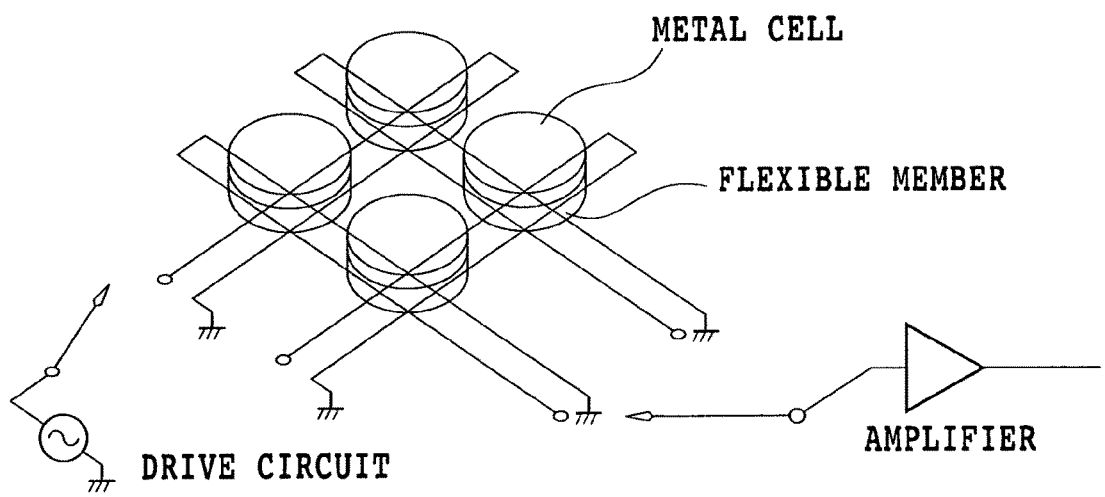
FIG. 10 is a diagram showing an example structure of the floor mat sensor.

FIG. 2 is a schematic block diagram illustrating the arrangement, according to this embodiment, of the data input apparatus 101 and the computer 110. The floor mat sensor 104, as shown in FIG. 10, is extended across the obverse surface of the data input apparatus 101, and when pressure is applied to the floor mat sensor 104 by being stepped on, for example, as shown in FIG. 7, a signal is output that is correlated with the location of the portion stepped on. FIG. 10 is a diagram illustrating the structure of the floor mat sensor, and FIG. 7 is a diagram illustrating an example wherein a large screen monitor is employed instead of a display device shown in FIG. 5. The floor mat sensor employed for this embodiment is a pressure sheet sensor incorporating electromagnetic induction technology, such as shown in FIG. 10 (see, for example, patent document 3); however, the type of sensor to be used is not limited, and another sensor, incorporating an arbitrary technology known to the technical field of this invention, can be employed. For example, instead of the pressure sensor employed for this embodiment, another one incorporating an arbitrary technology, such as an electrostatic sensor, may be employed, so long as the sensor can output a signal specifically designating the location foot pressure was applied.

Figure 6:
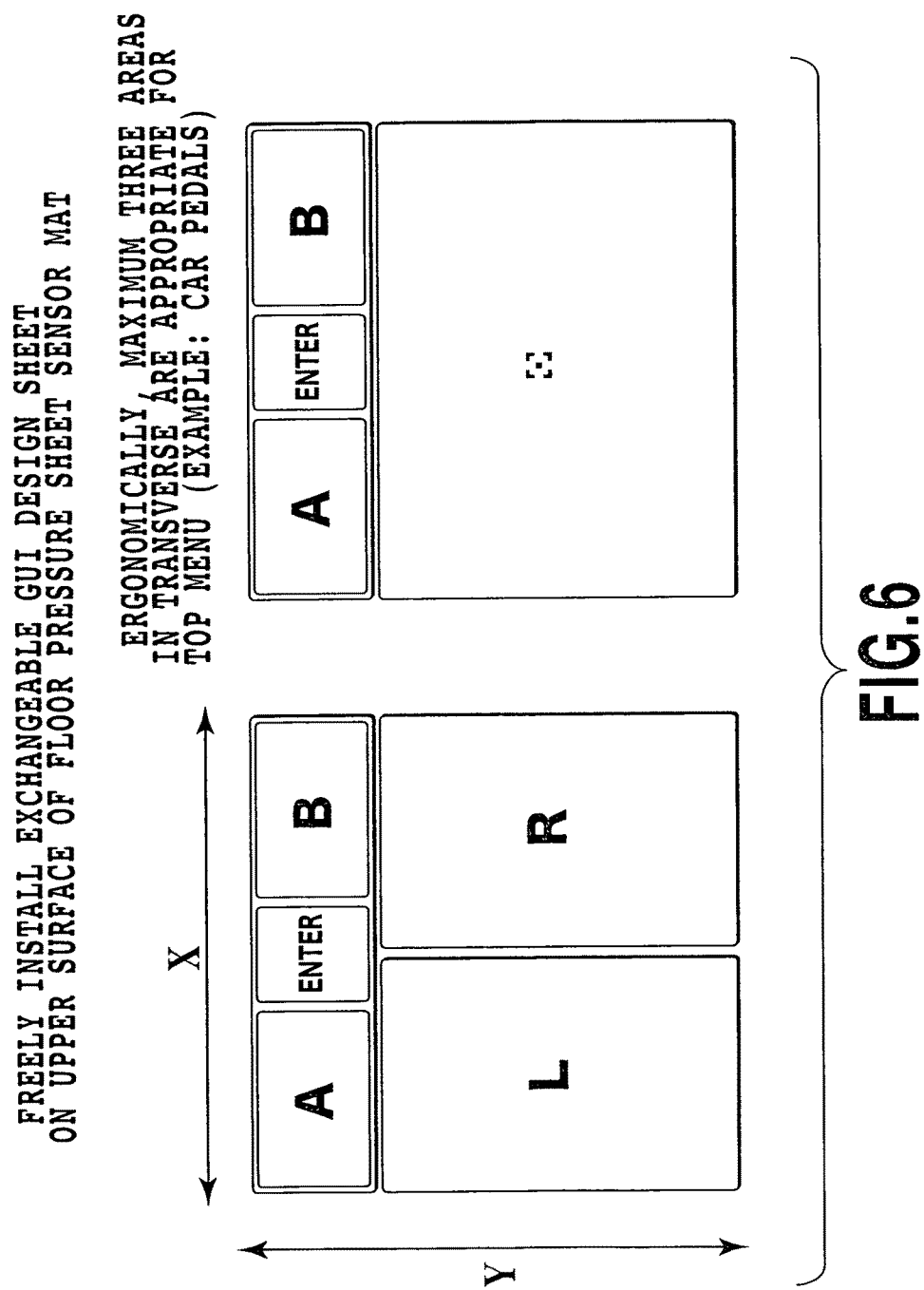
FIG. 6 is a diagram showing an example pattern for a floor mat sensor for the embodiment of the present invention.

A pattern representing input areas as shown in FIG. 6 is provided for the obverse surface of the floor mat sensor, and to separate input areas, such as "A" and "B", from another area, a horizontal bar is extended, at waist height. The operator holds the bar, and using the bar as a reference for the locations of the input areas, steps on the desired input area and corresponding data is output. An area A and an area B for entering corresponding data, and an area ENTER for the entry of data for the areas A and B are specifically shown in FIG. 6, and when one of these individual areas are stepped on, data for these areas are output. It should be noted that only when the operator steps on ENTER, the data for A or B, corresponding to the data input area that was stepped on, may be output. In other words, the method of this invention can also perform an operation whereby a pattern of signals that are generated by two or more successive steps of the operator is employed, and corresponding data are selected and output. A data selection for the two choices shown in FIG. 6 is comparatively simple for the processing performed by the method of the present invention. While taking into account simplification of the description, the example for A and B is employed for the following embodiments.

Referring to FIG. 2 again, the CPU 202 performs the data input processing for the output signal, which is the feature of this embodiment, and converts the signal into data that are transmitted, via an interface 203, to the computer 110. The computer 110, which generally includes a CPU 210, uses a RAM 212 to execute a program stored in a ROM 211, etc., and outputs to the display device 211, etc., the processing results that are obtained based on the data received from the data input apparatus 101.

Figure 3:
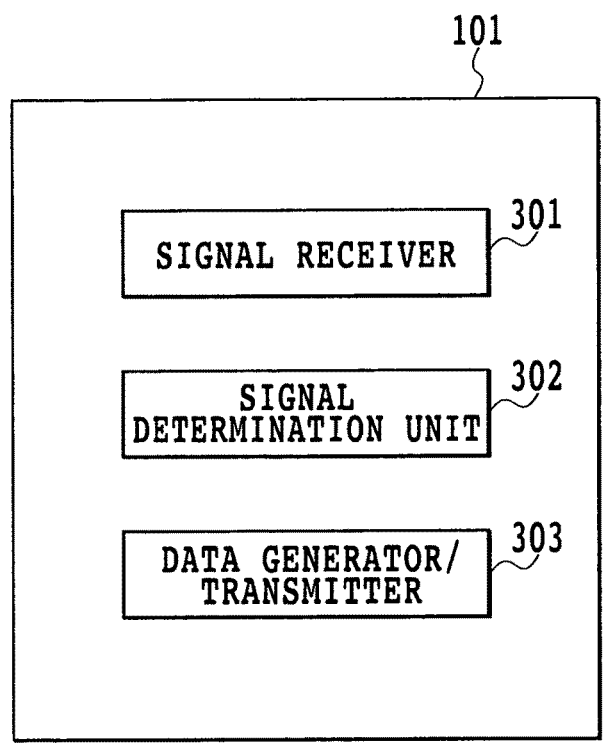
FIG. 3 is a block diagram illustrating example functional modules for a program processed by a CPU 202 of the data input apparatus 101 in the embodiment.

FIG. 3 is a block diagram illustrating example functional modules for a program processed by the CPU 202 of the data input apparatus 101 of this embodiment. As shown in FIG. 3, a signal receiver 301, a signal determination unit 302 and a data generator/transmitter 303 perform the processes for the data input apparatus 101. In this embodiment, three modules are employed for processing, beginning with the reception of a signal from the floor mat sensor and continuing until all the data are output; however, the modules that are employed are not limited to them, and either additional modules or fewer modules may be employed to perform the processing.

Figure 4:
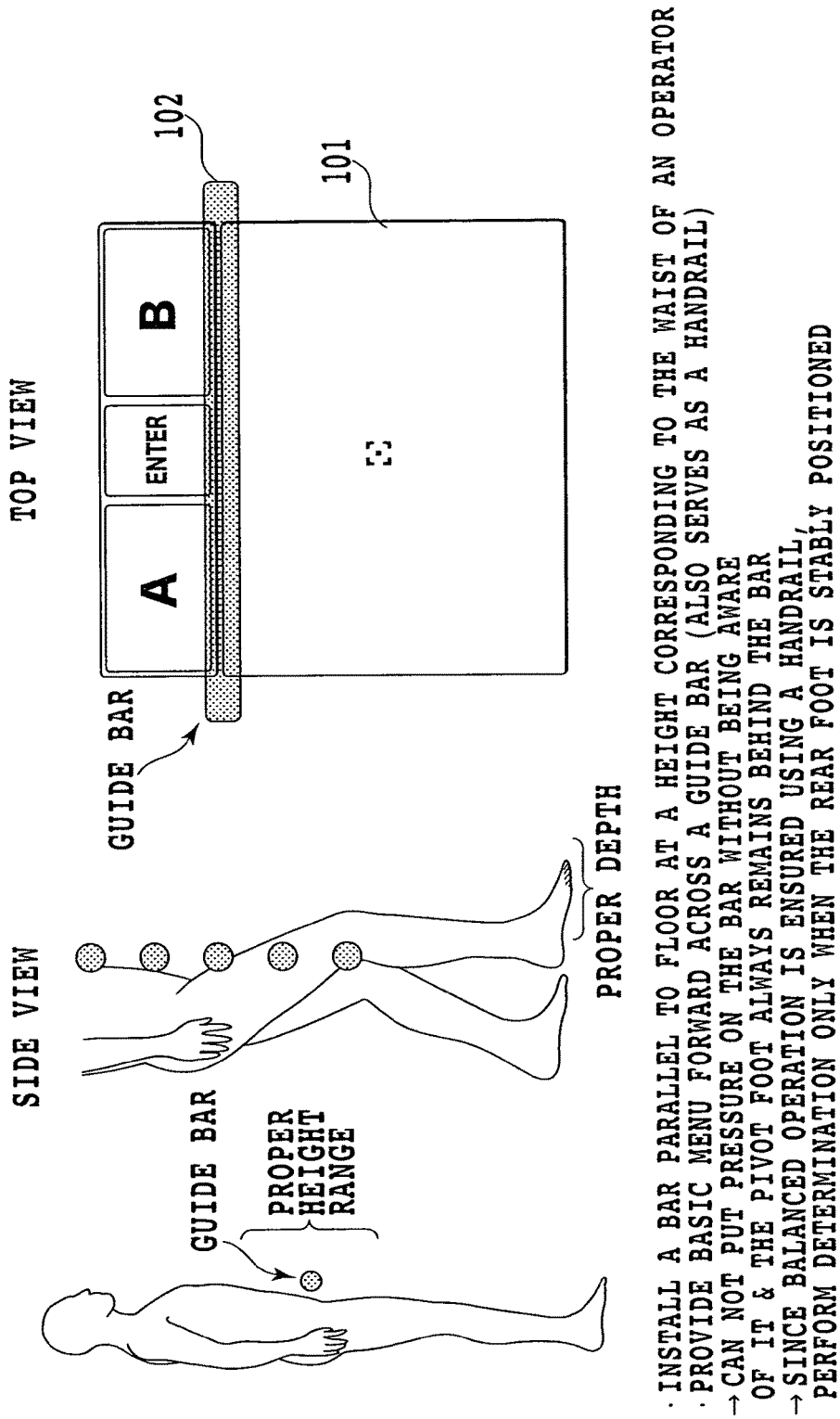
FIG. 4 is a diagram showing a position for setting a horizontal bar that is an example foot movement limitation means of the data input apparatus for the embodiment.

FIG. 4 is a diagram illustrating a typical bar setting position according to this embodiment. Various methods can be employed for mounting to the floor mat sensor the horizontal bar 102, which is foot movement limitation means for this embodiment. As an example, as shown in FIG. 1, the horizontal bar 102 is fixed between the two upright bar support portions 103 that are provided on the sides of the floor mat sensor, thereby defining an open space below for holding the feet. With this arrangement, the input areas, such as "A" and "B", can be precisely pressed by employing the horizontal bar 102 as a reference. Specifically, so long as an obstacle like the horizontal bar 102 is present, at least ergonomically, it does not happen that the operator can, with both feet, step on an area to which the shifting of the body is restricted (the area, opposite the operator, along the portion near the image of the horizontal bar 101 that is projected on the floor mat, i.e., the input area, such as "A" or "B" in FIG. 5, for example).

Therefore, the feet do not move to the area to which the shifting of the body is restricted, unless the operator actually intends to do so, and an effective prevention of erroneous input can be expected. As shown in FIG. 5, the boundary of the area to which the shifting of the body is restricted is a line formed by projecting the horizontal bar 102 onto the floor mat; however, as described above, the projected line need not match the boundary. That is, the boundary of the area to which shifting of the body is restricted may be either on the side opposite the operator, or on the same side as the operator, and an arbitrary shape for the boundary, such as a proper curve instead of a linear line, may be employed in accordance with the condition and purpose for which used. For example, while the movement of the operator is restricted at the height of the horizontal bar 102, the movement is less limited in the portion immediately below the horizontal bar 102, and there is a possibility that the operator can, with both feet, step on this portion, without being aware of doing so. In this case, it is effective that the boundary should be located at a greater distance from the operator (opposite the operator), so that the input areas can be designated at positions on which the operator does not step with both feet.

Further, when the horizontal bar 102 is set at an appropriate height, e.g., a height between the chest and around the knees of the operator, the operator maintains a specified distance (equivalent to the reach of the upper limbs) when holding the horizontal bar 102 as a handrail. Therefore, it is anticipated that, in effect, the operator will not step on the front areas (the input areas such as "A" and "B") of the floor mat sensor accidentally, without intention. Furthermore, although not shown, the height of the bar may be changed to adjust the bar at an appropriate height for each operator.

As described above in this embodiment, since the horizontal bar 102 is mounted and employed as the foot movement limitation means to provide a specified limitation for the foot movement, stepping on an area other than a pre-designated one can be prevented without requiring visual confirmation each time, and erroneous operations can be reduced. The foot movement limitation means can also be employed as a reference for an input area. In this embodiment, an erroneous operation can be prevented using such a horizontal bar 102. As described above, a feature of the present invention is that a member of a device that limits the movement of the feet is provided for an apparatus, such as a floor mat sensor, employing the feet for data input. Such a member or device is not limited to a form such the horizontal bar 102 for this embodiment, and various other forms may be employed. For example, as foot movement limitation means, an upright rod may be provided on the floor mat sensor, or part of the upper face of the floor mat sensor may be raised. Therefore, the feature of the present invention is that, to limit the movement of the feet, an arbitrary obstacle member is provided for a floor mat where input areas are designated, and using this obstacle member, erroneous entries are prevented and a man-machine interface is improved.

Figure 11:
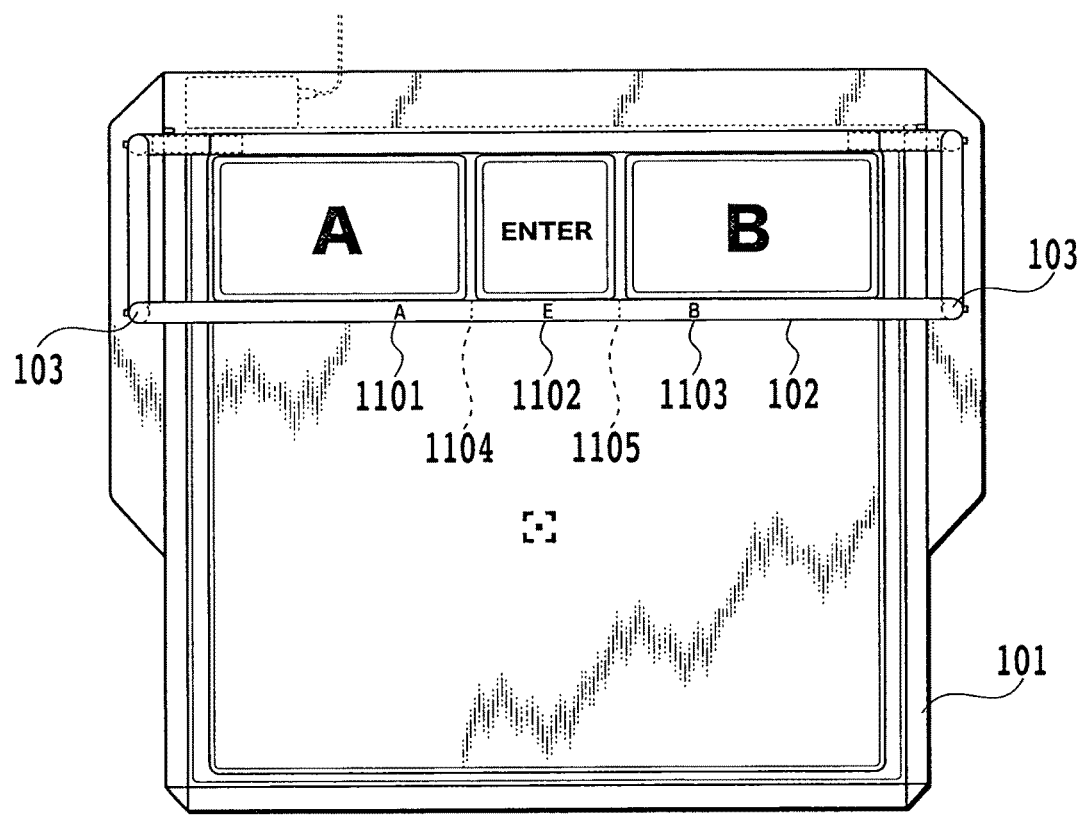
FIG. 11 is a diagram showing a pattern for displaying "A", "B" and "E" on the horizontal bar mounted to the floor mat according to another embodiment of the present invention.

Furthermore, the horizontal bar 102 may be formed of a single rod; however, when the bar is covered with different colors, in consonance with the design on a floor mat, data entry using the feet can be performed by watching the horizontal bar, without having to confirm the input areas on the floor mat. Specifically, referring to FIG. 11, for example, "A" 1101, "B" 1103 and "E" 1102, etc., are written on the horizontal bar 102, or coloring is provided thereon on portions corresponding to areas "A" and "B" and the area "ENTER" on the floor mat 101, so that, during an operation using the feet, the operator can continue to watch the screen to the front, and does not need drop the gaze to the floor mat. Instead of coloring, braille or raised and recessed portions may be provided at predetermined locations on the horizontal bar 102, or the surface texture may be changed, so that a visually impaired or blind person can also identify the input areas on the floor mat. Referring to the example in FIG. 11, the character portions "A" 1101, "B" 1103 and "E" 1102 and the boundaries 1104 and 1105 can be embossed, or braille can be added along these character portions.

Furthermore, an audio output device, such as a loudspeaker, can be mounted on the system of this embodiment to employ voice to transmit to the operator the display contents, or to information related to an operation. When this function is prepared, not only an image of the training contents can be displayed, but also the GUI configuration can be identified by using voice to announce instructions for training and the results that are obtained. Therefore, while holding the bar provided for the system, a visually impaired or blind operator can conduct simple training, such as standing on one foot or walking, that does not include much of the essence of play.

(Example Special Control)

In this embodiment, the following control processing is additionally performed to output data more accurately based on a signal that is output by the floor mat sensor when the mat is stepped on.

Figure 9:
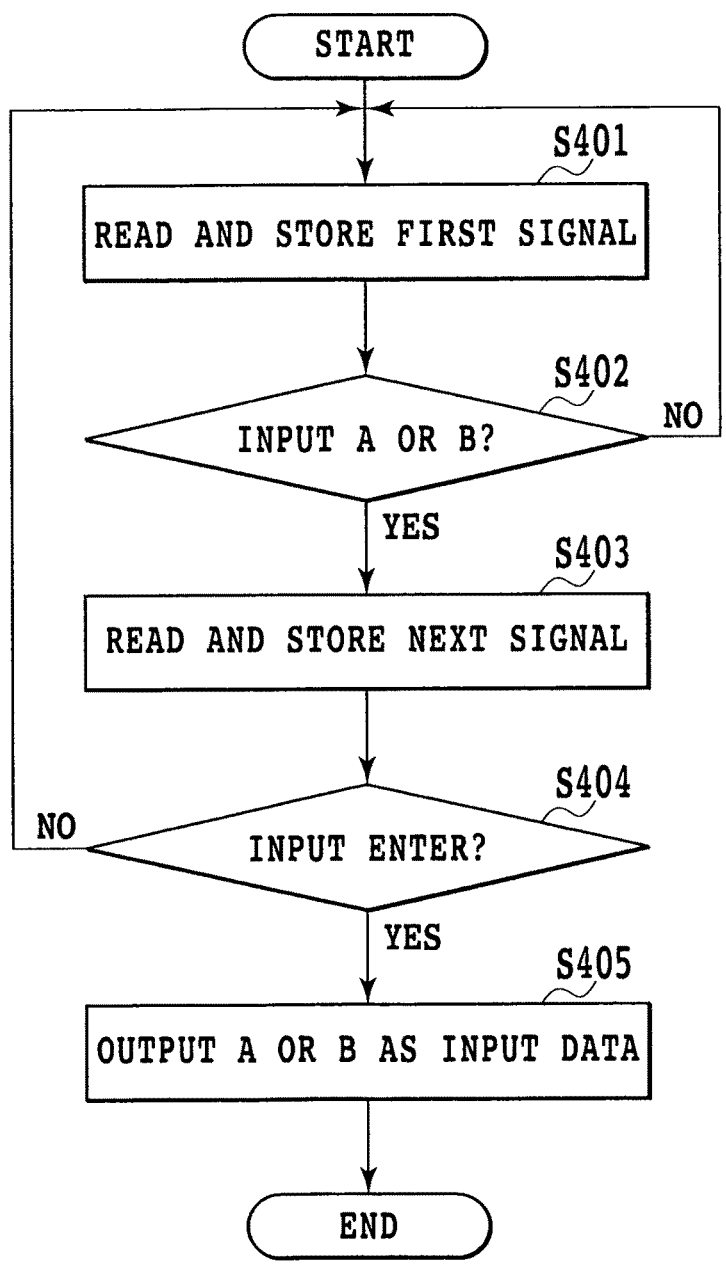
FIG. 9 is a flowchart showing the processing of a data input method according to this embodiment.

FIG. 9 is a flowchart showing the processing that is performed when an example control method for this embodiment is employed. This example control processing will now be described based on the flowchart in FIG. 9 and by referring to FIGS. 3 and 6. When input signals are generated, by stepping on arbitrary areas on the floor mat sensor in FIG. 6, the signal receiver 301 reads and stores the first signal (S401). And when the input signal is, for example, the one generated by stepping on area A on the floor mat sensor 104 in FIG. 6, this signal indicates data type "A". According to this example control method, at first a signal indicating a data type is received from the floor mat sensor, and then, a data confirmation signal indicating data has been confirmed is received, and thereafter, the first received information related to the data type is output, i.e., in this example, data A is output. Since the first signal should be a signal indicating a data type, and since, when the floor mat sensor shown in FIG. 6 is employed, such information is not output unless a signal indicating data type A or B has been received, at step S402 the signal determination unit 302 determines whether the obtained signal was generated by stepping on either the area A or B. In a case wherein a signal indicating a data type (A or B in the example in FIG. 6) has been received, first the signal receiver 301 reads the next input signal, and the signal determination unit 302 determines whether a data confirmation signal (a signal indicating ENTER in the example in FIG. 6) has been received (S404). When the received signal is a data confirmation signal, it is assumed that the first received information indicated by the data type has been entered, and the data generator/transmitter 303 generates data to this effect, and outputs the data externally (S405).

When the areas A and ENTER in the floor mat sensor pattern in FIG. 6 are successively stepped on, the special processing described above is performed, and accurate data (e.g., a code "1" or "A") indicating A was stepped on is output. Therefore, in addition to the above described limitation of the foot movement, erroneous input using the feet seldom occurs.

As described above, using the floor mat sensor, the data input apparatus of this invention can enter accurate data, and it is understood that this feature is more effective when ordinary use of the floor mat sensor is considered. Specifically, since the operator usually operates the floor mat sensor when standing, or sometimes when exercising, the floor mat sensor is frequently employed with a large screen monitor, such as is shown in FIG. 7, and is installed so separated from the screen, compared with when the operator is seated and is operating a computer. In this case, there is a tendency for the operator to keep looking at the distant screen, and to not glance frequently at the foot buttons or the user interface, and to perform an operation based simply on experience and memory. When the data input apparatus of this invention is employed in such a case, the operator can not only perform an accurate operation, but can also maintain a stable posture by holding the horizontal bar 102. For example, according to the example in FIG. 7, the operator performs the operation using the floor mat sensor 101 while watching the large screen monitor 701. In this example, since the confirmation button (ENTER in this case) is located at the front center of the mat, as shown in FIG. 6, the operator simply takes one step forward, facing the center of the screen, and does not need to look down at the feet each time.

Conventionally, for a game mat or a running machine, a control box that includes a start function, a reset function, etc., must be installed outside near the feet or a hand of an operator; however, such a control box is not required when this embodiment is employed. That is, when the data input method of this embodiment is employed, only a stepping combination, by the operator's feet, is required to enable the entry of a plurality of necessary functions, and a box used as a switch, etc., which is conventionally required for a game mat or a running machine, etc., can be eliminated. Therefore, the data input method can not only provide effects on cost reduction, but also does not require the operator to bend to operate a switch, or to manipulate another switch by hand, and all operations are available simply by using the feet.

Second Embodiment

According to this embodiment, in addition to the processing described in the first embodiment, a floor mat sensor can perform various processes based on pressure information acquired for a floor mat sensor portion on which an operator's foot has been placed. Specifically, a pressure sheet sensor incorporating the electromagnetic induction system, and having the structure shown in FIG. 10, is employed as a floor mat sensor for this embodiment, and a data input apparatus for this embodiment employs pressure information, output for individual foot locations by the floor mat sensor, in the performance of various processes, such as identifying the position of the center of gravity of the operator on the floor mat sensor. Therefore, the data input apparatus of this embodiment has the same system configuration as in the first embodiment, except that the floor mat sensor employed is limited to a pressure sheet sensor. In this embodiment, as shown in FIG. 6, the front portions of the floor mat sensor (areas where A and B are displayed) can be employed for entering data, and the rear portion can be employed for entering other data; i.e., the floor mat sensor can be employed not only as an input device for various data, but also as the data input apparatus as described in the first embodiment. Furthermore, access to the front and the rear portions is limited by a bar, and the entire area above which the bar is positioned can be regarded as a data input area.

For this example, a pressure sheet sensor incorporating the electromagnetic induction system shown in FIG. 10 is employed as the floor mat sensor shown in FIG. 6; however, the sensor is not limited to the type shown in FIG. 6, and an arbitrary pressure sensor can be employed so long as the sensor can obtain a pressure distribution by detecting pressure applied by objects on the floor mat.

Figure 8:
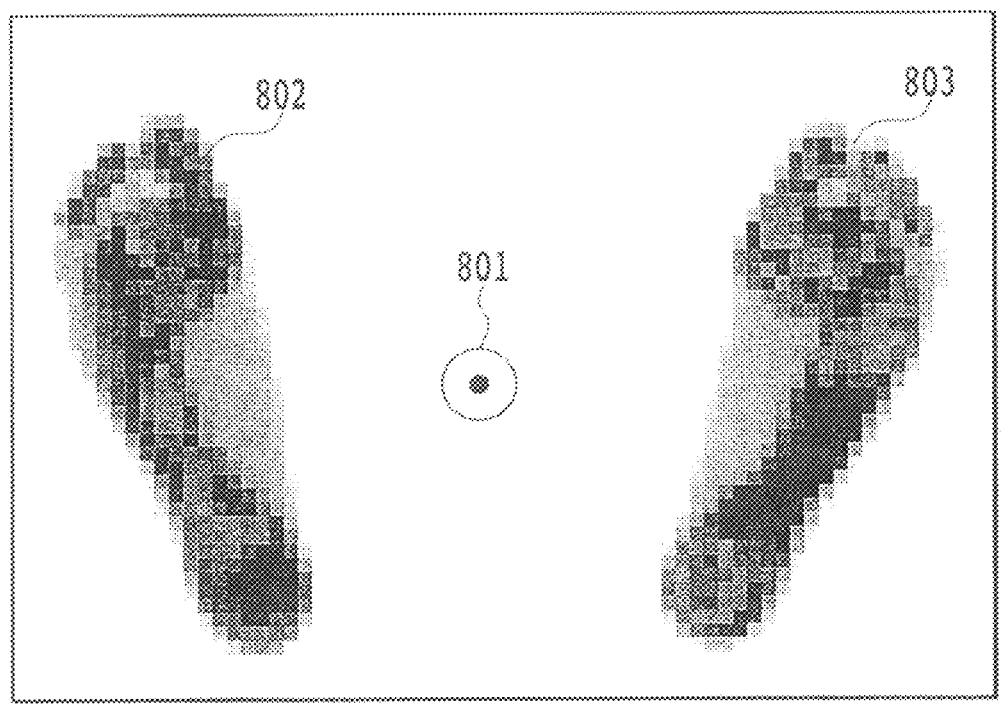
FIG. 8 is a diagram for explaining a gravity center detection method according to the embodiment of the present invention.

Among the various input processes performed by the data input apparatus using the floor mat sensor, an effective process is the one described above for detecting the center of gravity of the operator. A detailed explanation for this process will not be given, however, since the center of gravity can be obtained using an arbitrary method, well known in this technical field, for detecting the center of gravity using the pressure distribution of the feet, as shown in FIG. 8, for example, where pressure distribution patterns 802 and 803 for the feet are measured, and the center of gravity, a position 801, is obtained based on the obtained distribution patterns. When the standing position and the position of the center of gravity are detected based on the pressure distribution patterns of the feet, these positions can be employed for an application for a game, etc., wherein a character is moved on the display by changing the position of the gravity center.

In this embodiment, the detected position of the center of gravity is employed for outputting more accurate data. Specifically, in addition to the data determination method described in the first embodiment, data output is ensured when the operator presses, with only one foot, a data input area, such as A or B in FIG. 6, or a confirmation input area, such as ENTER. Usually, to select A or B the operator presses the area A or B with one foot, not with both feet, and when the entry of data is to be performed only upon the application of pressure using one foot, more accurate data can be provided. In this case, more accurate data can be provided by adding another determination condition according to which the foot opposite the foot used to step on a data input area or the confirmation input area, i.e., the pivot foot is located in the rear portion at a location other than the data input areas or the confirmation input area, and is not moved or is held steady. In such a case, when the operator is holding a bar, the body can be more stably supported and the bar can be employed as a reference for identifying an operating area.

As described above, unlike the data input apparatus in the first embodiment, which is employed only for entering data A and B, the data input apparatus is employed for another purpose, and in this case, since the operator not only employs the front portion of the floor mat sensor, but also frequently moves across the entire obverse surface, it is more difficult to issue a precise instruction for the front areas A and B. Therefore, the employment of the method of this invention is more effectively accomplished when the floor mat sensor of this embodiment is employed as a type of data input apparatus.

Third Embodiment

The arrangements for the first and the second embodiments are basically employed for this embodiment, except for part of the processing performed to employ a received signal for determining the type of data an operator intended to output. That is, according to the data input apparatus or to the method of this embodiment, the time that elapses from the reception of a signal indicating a data type, such as A or B, until a signal is received indicating data confirmation, is limited, and when a signal is received after a predetermined time has elapsed, the signal becomes invalid. Specifically, a known arbitrary method in the technical field of this invention can be employed, according to which, as an example, when a first signal is received (step S401 in FIG. 9), the signal is determined to be one indicating a data type (step S402 in FIG. 9). Successively, thereafter, a timer is started, and when the next signal is not received within a predetermined period of time, such as three to five seconds, the processing is terminated. In this case, when a signal is received before the period of time has expired but the signal received at step S404 does not indicate data confirmation, the processing is also terminated. However, instead of terminating the processing immediately, the reception of another signal may be waited for until the period of time has expired.

According to this embodiment, in the processing (steps S402 to S404 in FIG. 9) for determining the data type the operator intended to output, the entry of data is performed only when a plurality of signals are received at predetermined intervals. Therefore, erroneous data input can more effectively be reduced than in the above embodiments.

Fourth Embodiment

The arrangements for the first to the third embodiment are basically employed for this embodiment, except for the dynamic changing of a floor mat sensor pattern. That is, for a data input apparatus or method of this embodiment, a floor mat sensor pattern consisting of A, B and ENTER, which is a fixed pattern, for example, printed on a floor mat, is changed in accordance with a situation wherein the floor mat is employed, so that a more effective data entry is ensured. The floor mat sensor pattern can be changed (or displayed) using various methods, and this embodiment employs a method by which a pattern is projected from above the floor mat to display a floor mat sensor pattern. This method will now be more specifically described.

Figure 12:
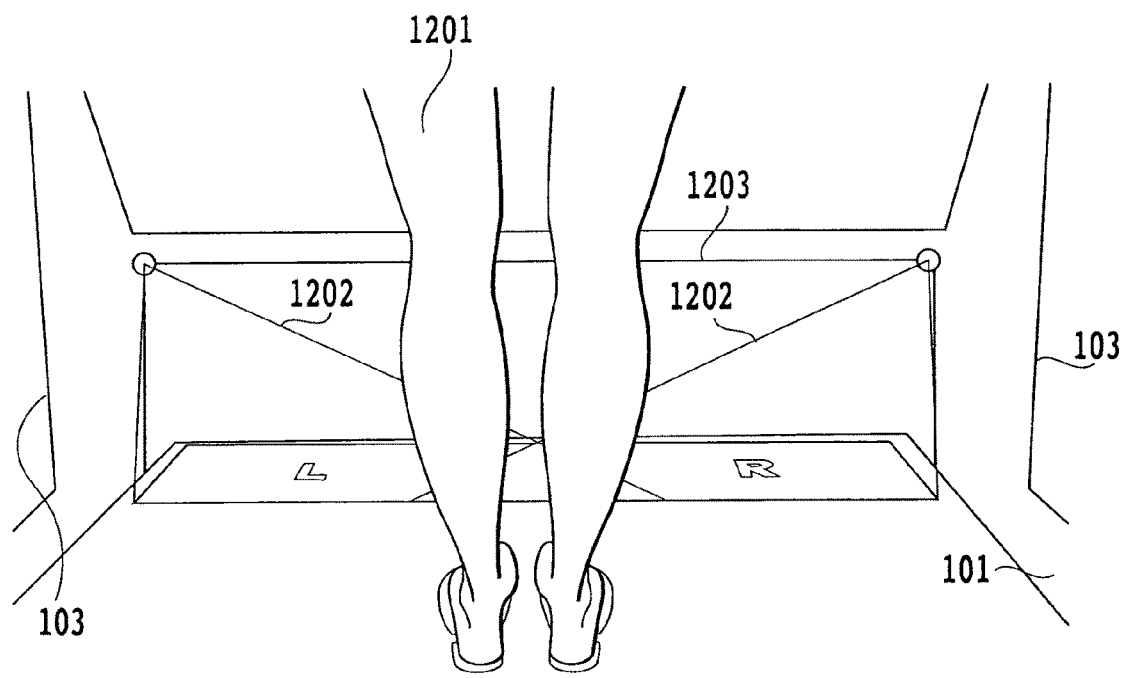
FIG. 12 is a diagram for explaining a pattern projection method according to a further embodiment.

FIG. 12 is a diagram for explaining a pattern projection method employed for this embodiment. An LED spotlight or a liquid crystal projector, which is projection means for projecting a pattern that will be described later, is mounted on bar support portions 103, and emits a projection light 1202 onto a floor mat to form a floor mat sensor pattern on the floor mat. When, as shown in FIG. 12, projection units are mounted on the bar support portions 103 and obliquely emit light, operator's feet 1104 do not interrupt the light, and a phenomenon can be avoided where a floor mat sensor pattern is not properly projected because the projection unit is hidden behind the feet.

Figure 13A:
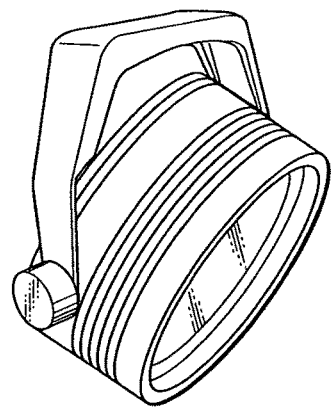
FIG. 13A is a diagram illustrating an example projection unit employed for this embodiment.
Figure 13B:
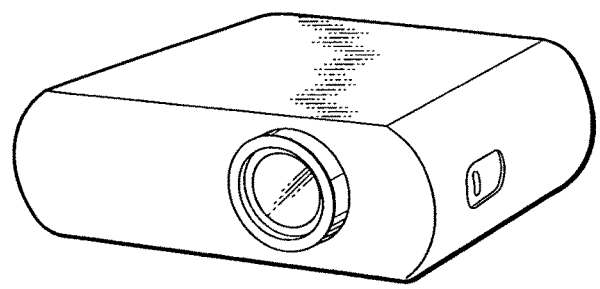
FIG. 13B is a diagram illustrating another example projection unit employed for this embodiment.
Figure 14C:
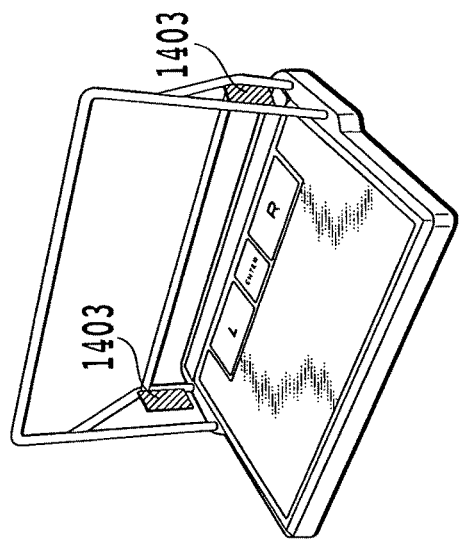
FIG. 14C is a diagram illustrating an example wherein projection units are mounted on the apparatus to perform a transverse projection.
Figure 14B:
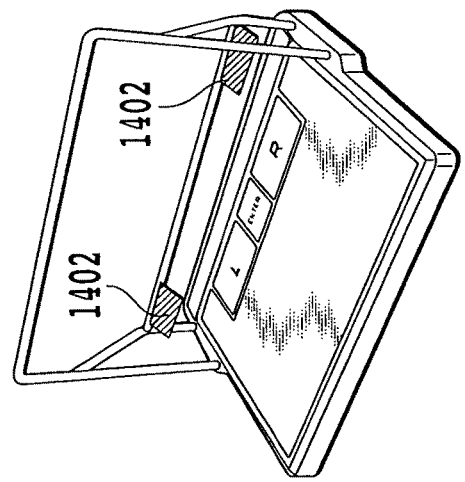
FIG. 14B is a diagram illustrating an example wherein projection units are mounted on the apparatus to perform an oblique projection from both ends.
Figure 14A:
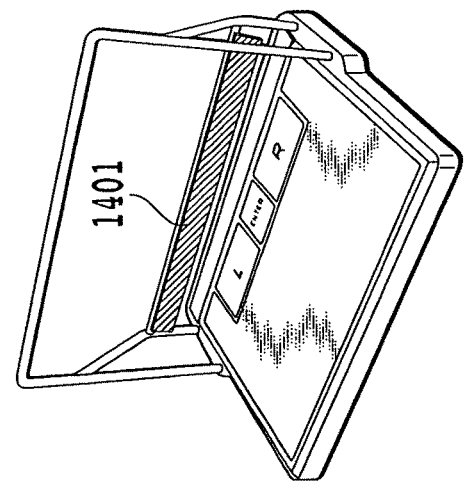
FIG. 14A is a diagram illustrating an example wherein a projection unit is mounted on the apparatus, so as to be horizontal to one part of a bar supporting member.

FIGS. 13A and 13B are diagrams illustrating example projection units employed for this embodiment. An example LED color spotlight is shown in FIG. 13A, and an example liquid crystal projector is shown in FIG. 13B. In this embodiment, the devices shown in FIGS. 13A and 13B are employed as projection units; however, various other known projection units in the technical field of this invention can be employed, or instead of the projection units, various devices or members that can dynamically change a pattern can be employed. As described above, the projection units should be installed on the apparatus so they are not hidden behind the operator's feet. FIGS. 14A, 14B and 14C show examples for this embodiment wherein projection units are mounted on the apparatus. The example in FIG. 14A employs a unit 1401 that is horizontally mounted on one part of the bar support portions, the example in FIG. 14B employs projection units 1402 that project light obliquely from both ends, and the example in FIG. 14C employs projection units 1403 that project light transversely.

Since the projection units 1401, 1402 and 1403, shown in FIGS. 14A, 14B and 14C, are mounted at the front of the apparatus, the light is seldom interrupted by the feet of the operator. In this embodiment, areas L, R and ENTER are projected using different colors, and it would be easily understood by one having ordinary skill in the art that various other patterns can be projected using the projection units. Further, the setting and adjustment required for the projection units, such as an adjustment for distortion generated due to the mounting positions, can be performed by a known method in the technical field of this invention, and no further explanation for this will be given. In this embodiment, a pattern is projected mainly on areas to which the shifting of the body is restricted; however, the projection area is not limited to this, and a pattern may be projected onto the entire floor mat sensor using the projection units. Furthermore, in this embodiment, since a pattern is formed by light projection, it might be difficult to see the pattern when natural light is strong, and therefore, the preparation of an acrylic plate 1203 to block light, as shown in FIG. 12, can be effective.

The projection units used for this embodiment are also connected to a computer 110, and various patterns can be transmitted from the computer 110 and projected onto the floor mat sensor. FIGS. 15A to 15F are diagrams showing example floor mat sensor patterns that are thus projected. Also in this embodiment, during the operation of the apparatus, the operator is playing a game or taking exercise, while watching a monitor, as shown in FIG. 7, and can select various patterns that are displayed on the floor mat sensor in consonance with the contents displayed on the monitor, or the contents that are currently performed during the processing.

For changing the floor mat sensor pattern in various ways, basically, a plain material having high reflectivity, shown in FIG. 15, for example, that is allowable for use in accordance with the technical field of this invention, is adhered to the obverse surface of the floor mat sensor, so that the projection of a floor mat sensor pattern is ensured. Various types of patterns are projected onto the above described floor mat sensor to obtain the floor mat sensor patterns, and the example in FIG. 15B employs the most standard pattern, which includes L and R. In the example in FIG. 15C, a specific video image, for example, is displayed on the monitor, and the operator can select play, fast forward, etc. Likewise, the pattern in FIG. 15D allows the operator to select top, bottom, right or left, and the patterns in FIGS. 15E and 15F are for the use of two persons. In these patterns, two sets of footprints are displayed to represent the positions of persons when two are using the apparatus, but these footprints are not requisite (instead, a notification representing this status, for example, may be displayed on the monitor). Further, this footprint pattern may also be formed by using a projection unit, described above, that is used for projecting a pattern for other than data input areas.

Figure 16:
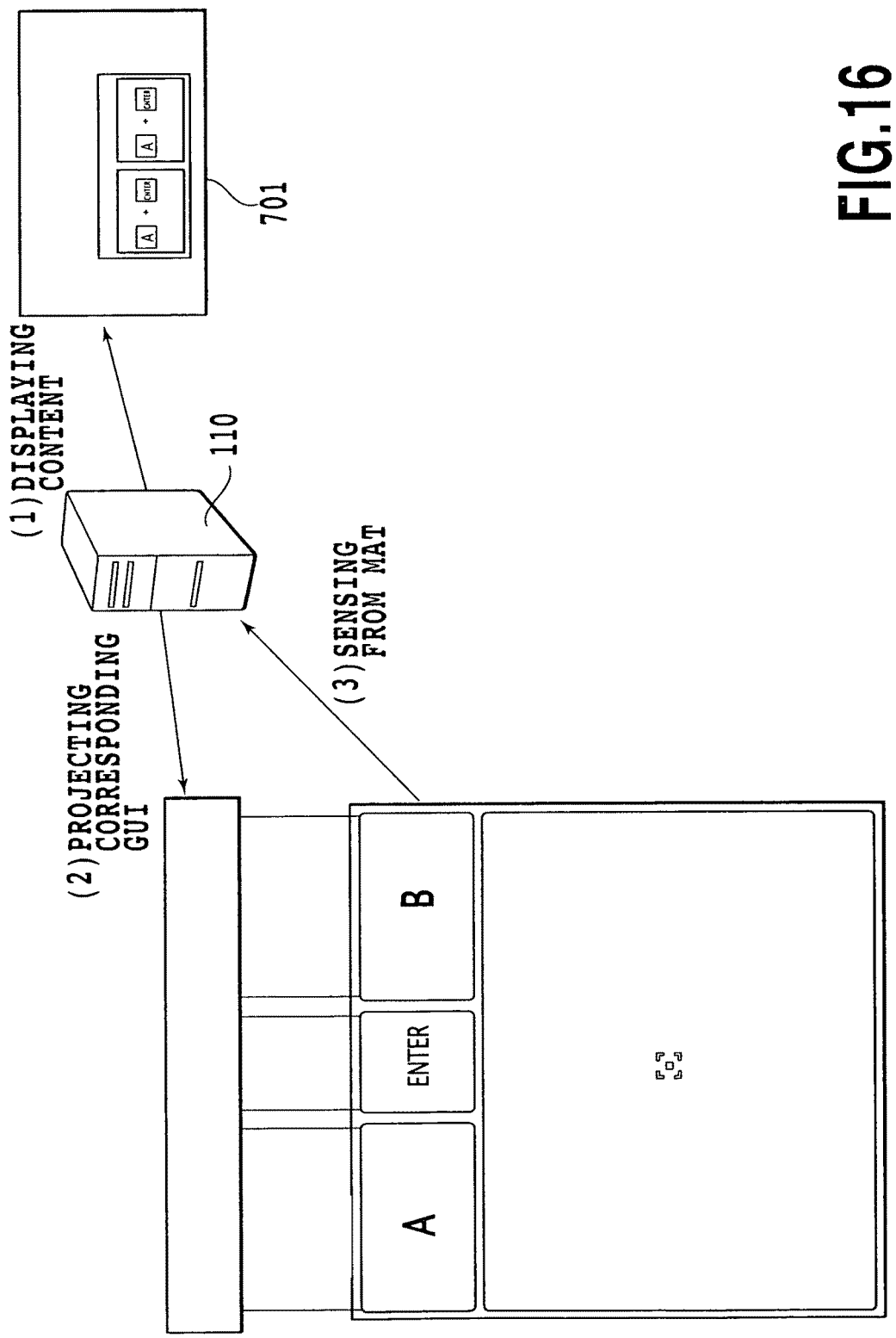
FIG. 16 is a diagram showing an example use of a variable floor mat sensor pattern according to the embodiment of the present invention.
Figure 17:
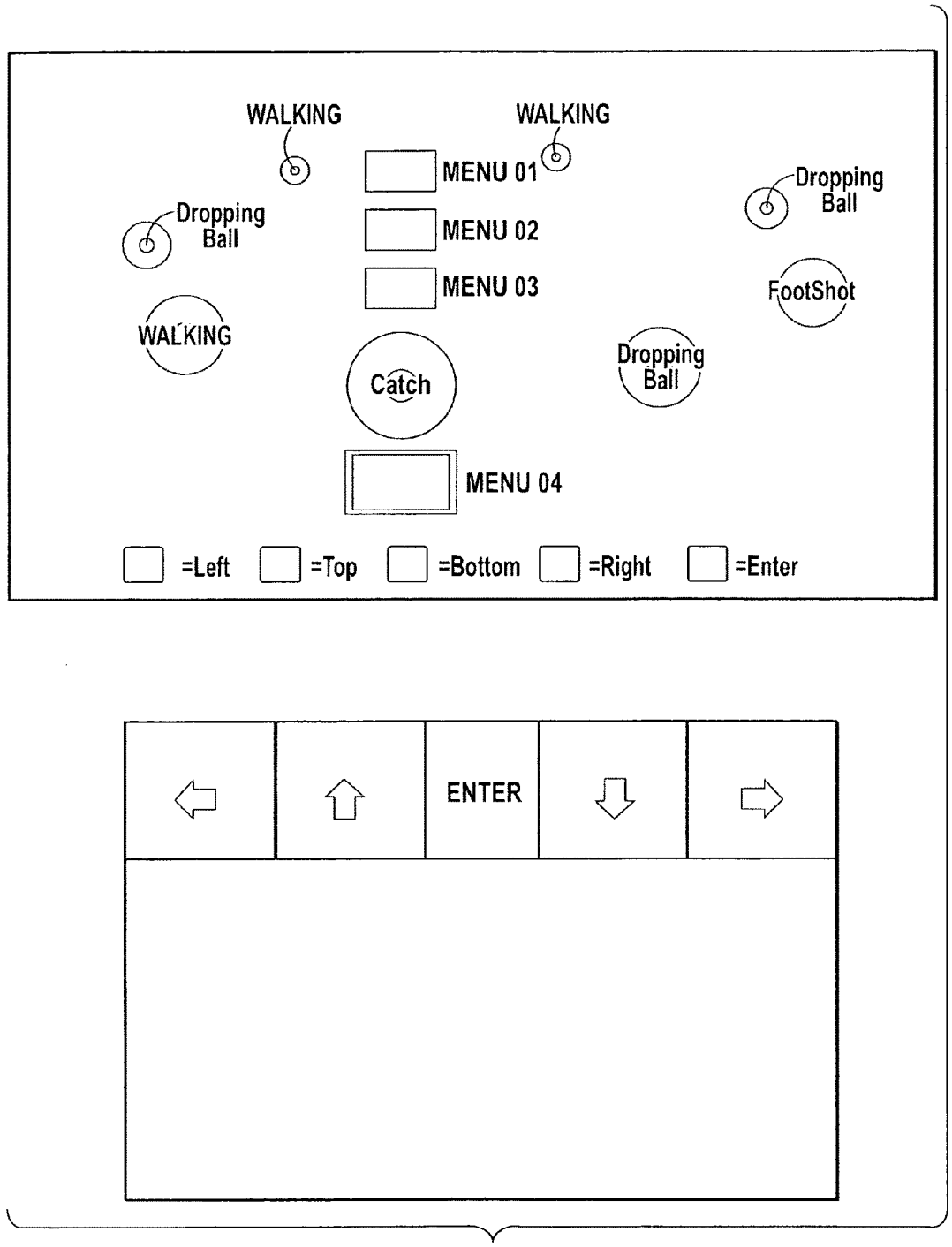
FIG. 17 is a diagram showing another example use of a variable floor mat sensor pattern according to the embodiment of the present invention.

FIG. 16 is a diagram illustrating an example wherein the variable floor mat sensor of this embodiment is employed. This example is a comparatively orthodox application, and when the initial input pattern includes L and R, an instruction for changing the input pattern to A and B is displayed on a monitor 701, and based on the instruction, the floor mat sensor pattern is changed. As shown in FIG. 16, the computer 110 displays choices A and B on the monitor 701, and also issues an instruction to the projection unit, which then projects a new floor mat sensor pattern for A and B. Thereafter, when the operator steps on one of the projected areas A or B while watching the monitor 701, data corresponding to the area stepped on is transmitted to the computer 110, as described in the first embodiment.

Figure 18:
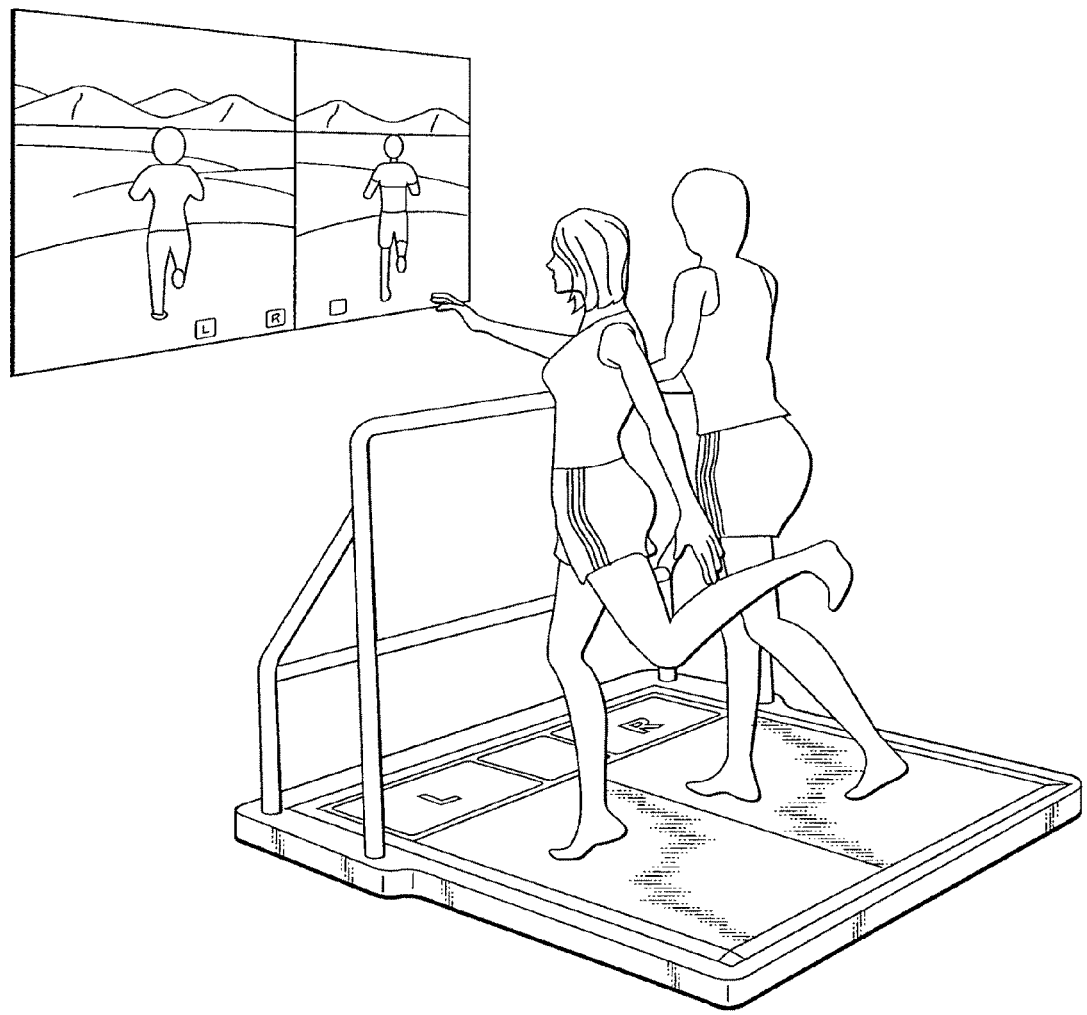
FIG. 18 is a diagram showing an additional example use of a variable floor mat sensor pattern according to the embodiment of the present invention.
Figure 19:
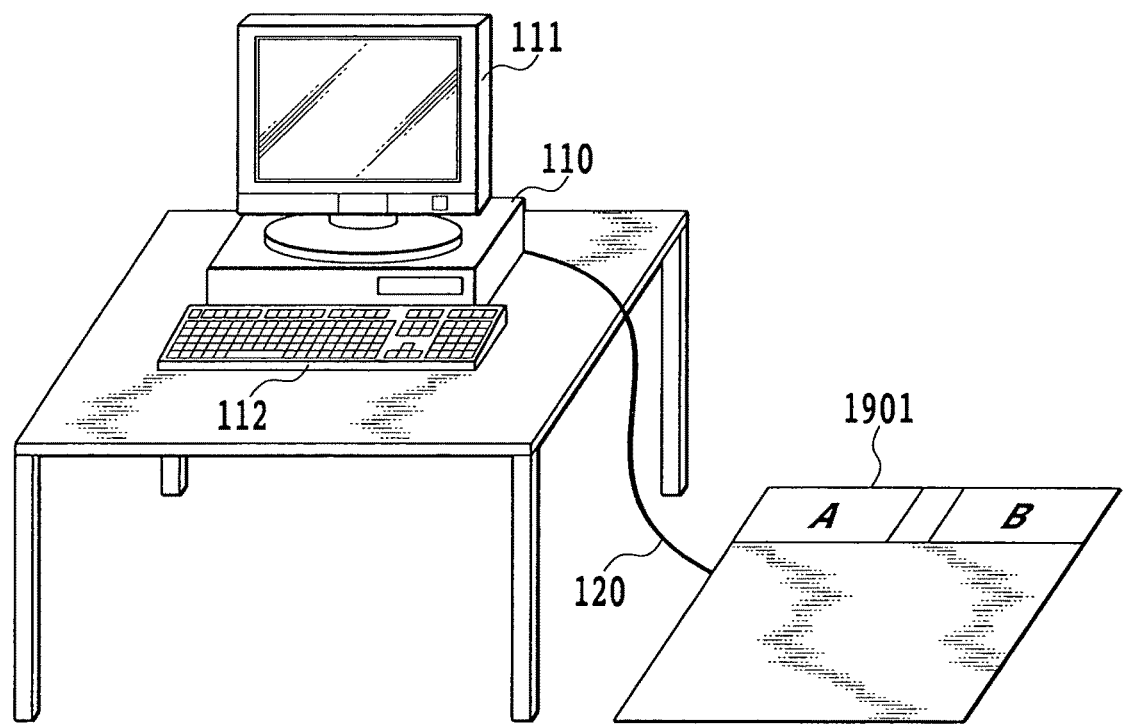
FIG. 19 is a diagram illustrating the general structure of a system according to an additional embodiment of the present invention.

FIGS. 18 and 19 are diagrams illustrating another example application of the variable floor mat sensor pattern for this embodiment. Referring to FIG. 18, a game of some kind is displayed on the monitor 701, and the areas L and R, provided for the initial input pattern, are displayed using more segments, top, bottom, right and left, indicated by arrows, and the floor mat sensor pattern is changed in accordance with this alteration. Likewise in FIG. 19, an instruction for an exercise is displayed on the monitor 701, and when the operator selects L or R, the portion at the left or right foot of the operator is lighted up.

According to this embodiment, since the floor mat sensor pattern is variously changed in accordance with the contents, it is helpful to prepare the contents more dynamically.

Fifth Embodiment

FIG. 19 is a diagram illustrating the general configuration of a system according to this embodiment of the present invention. In this embodiment, a floor mat sensor is extended across the obverse surface of a data output apparatus 1901, and when a predetermined area of the floor mat sensor is stepped on, data corresponding to the portion is output. The output data is transmitted to a computer 110 via a cable 120, for example, and the computer 110 can employ the received data for various processes. For example, when use of a keyboard 112 is disabled, two choices are displayed on a display device 111 and the operator steps on a predetermined position of the data output apparatus 1901 to select one.

Figure 21:
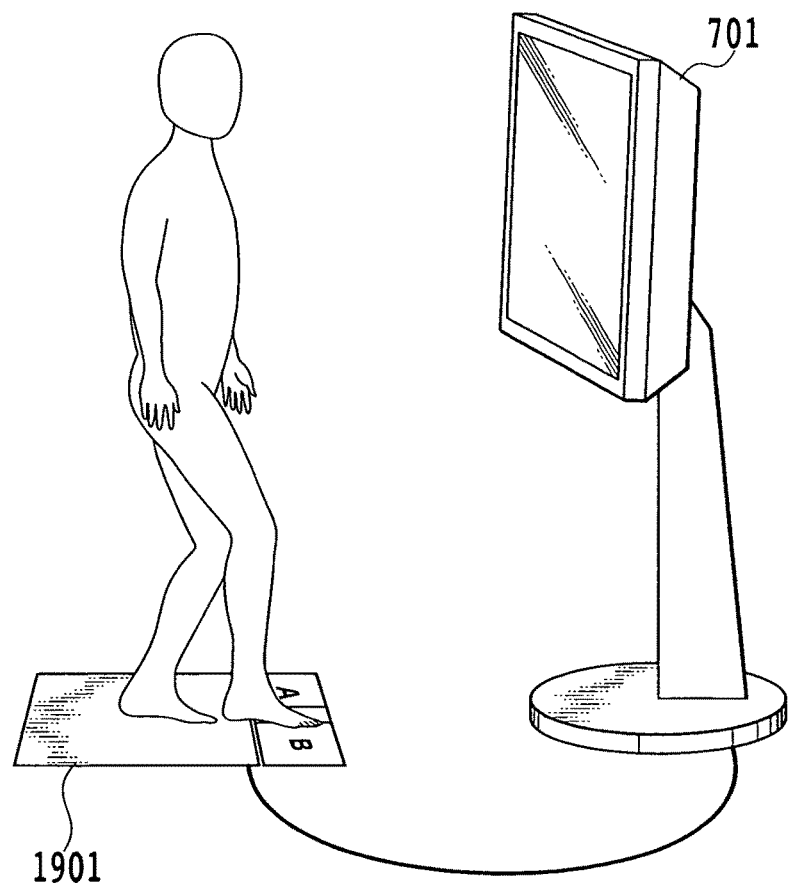
FIG. 21 is a diagram for explaining the state of this embodiment wherein a floor mat sensor is pressed by a foot.

FIG. 2 is a schematic block diagram illustrating the arrangement for the data output apparatus and the computer 110 of this embodiment. The floor mat sensor 104 shown in FIG. 10 is provided for the obverse surface of the data output apparatus 1901, and when pressure is applied, for example, by stepping on the floor mat sensor 104, as shown in FIG. 21, a signal consonant with the portion stepped on is output. FIG. 10 is a diagram showing an example structure for the floor mat sensor, and FIG. 21 is a diagram showing an example wherein a large screen monitor is employed instead of the display device in FIG. 19. The floor mat sensor employed in this embodiment is a pressure sheet sensor incorporating the electromagnetic induction system shown in FIG. 10 (see, for example, patent document 3); however, the sensor type is not limited to this, and an arbitrary technology known to the technical field of this invention can be employed.

A pattern representing input areas shown in FIG. 6 is designed on the obverse surface of the floor mat sensor, and when the operator steps on the area indicating the entry of desired data, the data is transmitted from the data output apparatus 1901. Specifically, the area for entering A, the area for entering B and the confirmation area for entering ENTER are shown in FIG. 6. In this embodiment, the operator first steps on the data input area A or B, and then the area ENTER, so that the first data A or B is output. As described above, according to the data output method of this invention, based on a signal pattern generated by successively stepping on the areas twice or more, corresponding data is determined and output. A selection for two data choices shown in FIG. 6 is comparatively simple for the method of the present invention. While taking into account simplification of the description, the example for A and B is employed for the following embodiments.

Referring to FIG. 2 again, the CPU 202 performs the data output processing method for the output signal, which is the feature of this embodiment, and converts the signal into data that are transmitted, via an interface 203, to the computer 110. The computer 110, which generally includes a CPU 210, uses a RAM 212 to execute a program stored in a ROM 211, etc., and outputs to the display device 211, etc., the processing results that are obtained based on the data received from the data output apparatus 1901.

Figure 20:
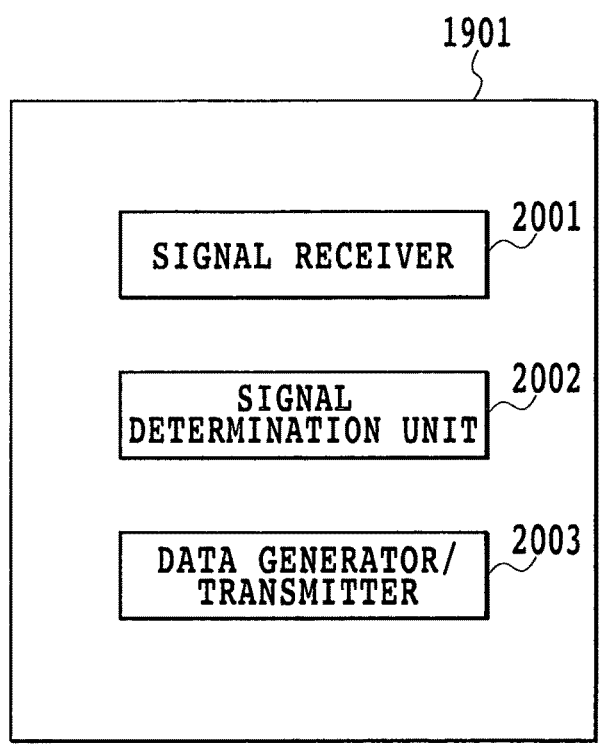
FIG. 20 is a block diagram illustrating example functional modules for a program processed by the CPU of a data output apparatus according to this embodiment.

FIG. 20 is a block diagram illustrating example functional modules for a program processed by the CPU 202 of the data output apparatus 1901 of this embodiment. As shown in FIG. 20, a signal receiver 2001 that is reception means, a signal determination unit 2002 that is transmission means and a data generator/transmitter 2003 perform the processes for the data output apparatus 1901. In this embodiment, three modules are employed for processing, beginning with the reception of a signal from the floor mat sensor and continuing until all the data are output; however, the modules that are employed are not limited to them, and either additional modules or fewer modules may be employed to perform the processing.

FIG. 9 is a flowchart showing the processing that is performed by the data output method for this embodiment is employed. This data output processing will now be described based on the flowchart in FIG. 9 and by referring to FIGS. 6 and 20. When signals are generated, by stepping on arbitrary areas on the floor mat sensor in FIG. 6, the signal receiver 2001 reads and stores the first signal (S401). And when the input signal is, for example, the one generated by stepping on area A on the floor mat sensor 104 in FIG. 6, this signal indicates data type "A". According to this data output method, at first a signal indicating a data type is received from the floor mat sensor, and then, a data confirmation signal indicating data has been confirmed is received, and thereafter, the first received information related to the data type is output, i.e., in this example, data A is output. Since the first signal should be a signal indicating a data type, and since, when the floor mat sensor shown in FIG. 6 is employed, such information is not output unless a signal indicating data type A or B has been received, at step S402 the signal determination unit 2002 determines whether the obtained signal was generated by stepping on either the area A or B. In a case wherein a signal indicating a data type (A or B in the example in FIG. 6) has been received, first the signal receiver 2001 reads the next input signal, and the signal determination unit 2002 determines whether a data confirmation signal (a signal indicating ENTER in the example in FIG. 6) has been received (S404). When the received signal is a data confirmation signal, it is assumed that the first received information indicated by the data type has been entered, and the data generator/transmitter 2003 generates data to this effect, and outputs the data externally (S405).

When the areas A and ENTER in the floor mat sensor pattern in FIG. 6 are successively stepped on, the processing described above is performed, and accurate data (e.g., a code "1" or "A") indicating A was stepped on is output. Therefore, erroneous input using the feet seldom occurs.

As described above, using the floor mat sensor, the data output apparatus or method of this invention can enter accurate data, and it is understood that this feature is more effective when ordinary use of the floor mat sensor is considered. Specifically, since the operator usually operates the floor mat sensor when standing, or sometimes when exercising, the floor mat sensor is frequently employed with a large screen monitor, such as is shown in FIG. 21, and is installed so separated from the screen, compared with when the operator is seated and is operating a computer. In this case, there is a tendency for the operator to keep looking at the distant screen, and to not glance frequently at the foot buttons or the user interface, and to perform an operation based simply on experience and memory. When the data output apparatus or method of this invention is employed in such a case, the operator can not only perform an accurate operation, but can also maintain a stable posture by holding the horizontal bar 102. For example, according to the example in FIG. 21, the operator performs the operation using the floor mat sensor 1901 while watching the large screen monitor 701. In this example, since the confirmation button (ENTER in this case) is located at the front center of the mat, as shown in FIG. 6, the operator simply takes one step forward, facing the center of the screen, and does not need to look down at the feet each time.

Conventionally, for a game mat or a running machine, a control box that includes a start function, a reset function, etc., must be installed outside near the feet or a hand of an operator; however, such a control box is not required when this embodiment is employed. That is, when the data output method of this embodiment is employed, only a stepping combination, by the operator's feet, is required to enable the entry of a plurality of necessary functions, and a box used as a switch, etc., which is conventionally required for a game mat or a running machine, etc., can be eliminated. Therefore, the data input method can not only provide effects on cost reduction, but also does not require the operator to bend to operate a switch, or to manipulate another switch by hand, and all operations are available simply by using the feet.

Further, when a combination of steps and pressing of the ENTER area is performed, data transmission processing equivalent to entries made using various keys, which is required for a PC, is enabled.

Sixth Embodiment

According to this embodiment, in addition to the processing described in the fifth embodiment, a floor mat sensor can perform various processes based on pressure information acquired for a floor mat sensor portion on which an operator's foot has been placed. Specifically, a pressure sheet sensor incorporating the electromagnetic induction system, and having the structure shown in FIG. 10, is employed as a floor mat sensor for this embodiment, and a data output apparatus for this embodiment employs pressure information, output for individual foot locations by the floor mat sensor, in the performance of various processes, such as identifying the position of the center of gravity of the operator on the floor mat sensor. Therefore, the data output apparatus of this embodiment has the same system configuration as in the first embodiment, except that the floor mat sensor employed is limited to a pressure sheet sensor. In this embodiment, as shown in FIG. 6, the front portions of the floor mat sensor (areas where A and B are displayed) can be employed for entering data, and the rear portion can be employed for entering other data; i.e., the floor mat sensor can be employed not only as an input device for various data, but also as the data input apparatus as described in the first embodiment. For this example, a pressure sheet sensor incorporating the electromagnetic induction system shown in FIG. 10 is employed as the floor mat sensor shown in FIG. 6; however, the sensor is not limited to the type shown in FIG. 6, and an arbitrary pressure sensor can be employed so long as the sensor can obtain a pressure distribution by detecting pressure applied by objects on the floor mat.

Among the various input processes performed by the data input apparatus using the floor mat sensor, an effective process is the one described above for detecting the center of gravity of the operator. A detailed explanation for this process will not be given, however, since the center of gravity can be obtained using an arbitrary method, well known in this technical field, for detecting the center of gravity using the pressure distribution of the feet, as shown in FIG. 8, for example, where pressure distribution patterns 802 and 803 for the feet are measured, and the center of gravity, a position 801, is obtained based on the obtained distribution patterns. When the standing position and the position of the center of gravity are detected based on the pressure distribution patterns of the feet, these positions can be employed for an application for a game, etc., wherein a character is moved on the display by changing the position of the gravity center.

In this embodiment, the detected position of the center of gravity is employed for outputting more accurate data. Specifically, in addition to the data determination method described in the first embodiment, data output is ensured when the operator presses, with only one foot, a data input area, such as A or B in FIG. 6, or a confirmation input area, such as ENTER. Usually, to select A or B the operator presses the area A or B with one foot, not with both feet, and when the entry of data is to be performed only upon the application of pressure using one foot, more accurate data can be provided. In this case, more accurate data can be provided by adding another determination condition according to which the foot opposite the foot used to step on a data input area or the confirmation input area, i.e., the pivot foot is located in the rear portion at a location other than the data input areas or the confirmation input area, and is not moved or is held steady. In such a case, when the operator is holding a bar, the body can be more stably supported and the bar can be employed as a reference for identifying an operating area.

As described above, unlike the data output apparatus in the first embodiment, which is employed only for entering data A and B, the data input apparatus is employed for another purpose, and in this case, since the operator not only employs the front portion of the floor mat sensor, but also frequently moves across the entire obverse surface, it is more difficult to issue a precise instruction for the front areas A and B. Therefore, the employment of the method of this invention is more effectively accomplished when the floor mat sensor of this embodiment is employed as a type of data input apparatus.

Seventh Embodiment

The arrangements for the fifth and the sixth embodiments are basically employed for this embodiment, except for part of the processing performed to employ a received signal for determining the type of data an operator intended to output. That is, according to the data output apparatus or to the method of this embodiment, the time that elapses from the reception of a signal indicating a data type, such as A or B, until a signal is received indicating data confirmation, is limited, and when a signal is received after a predetermined time has elapsed, the signal becomes invalid. Specifically, a known arbitrary method in the technical field of this invention can be employed, according to which, as an example, when a first signal is received (step S401 in FIG. 9), the signal is determined to be one indicating a data type (step S402 in FIG. 9). Successively, thereafter, a timer is started, and when the next signal is not received within a predetermined period of time, such as three to five seconds, the processing is terminated. In this case, when a signal is received before the period of time has expired but the signal received at step S404 does not indicate data confirmation, the processing is also terminated. However, instead of terminating the processing immediately, the reception of another signal may be waited for until the period of time has expired.

According to this embodiment, in the processing (steps S402 to S404 in FIG. 9) for determining the data type the operator intended to output, the entry of data is performed only when a plurality of signals are received at predetermined intervals. Therefore, erroneous data input can more effectively be reduced than in the above embodiments.

Eighth Embodiment

This embodiment provides an apparatus that includes means, such as a video camera, for imaging an operator, in addition to the means of the first embodiment, to extract movements of the operator, and that employs this means, together with an input method using a floor mat, to identify an operation through intuition. That is, an image recognition apparatus that employs a three-dimensional image pick-up device is connected to the floor mat sensor for the first embodiment, an operating mode is designated using a floor mat, and an instruction issued by the operator, such as an operating gesture, is more appropriately identified using the image recognition apparatus. Specifically, when L or R on the floor mat 101 in FIG. 1 is stepped on, for example, the operating mode is started and the recognition process is initiated by assuming that the movement of the operator is an operating gesture. For other cases, the movement of the operator is assumed to be a mere gesture and the process is not performed. In this case, an arbitrary method known in the technical field of this invention can be employed for typical gestures and for the recognition method. For example, when the operator moves his or her hand up or down, it is assumed that this movement represents the scrolling of a screen, and a corresponding operation is performed, or when the operator is pretending to write characters, characters are written along the trajectory taken by the hand.

Figure 22:
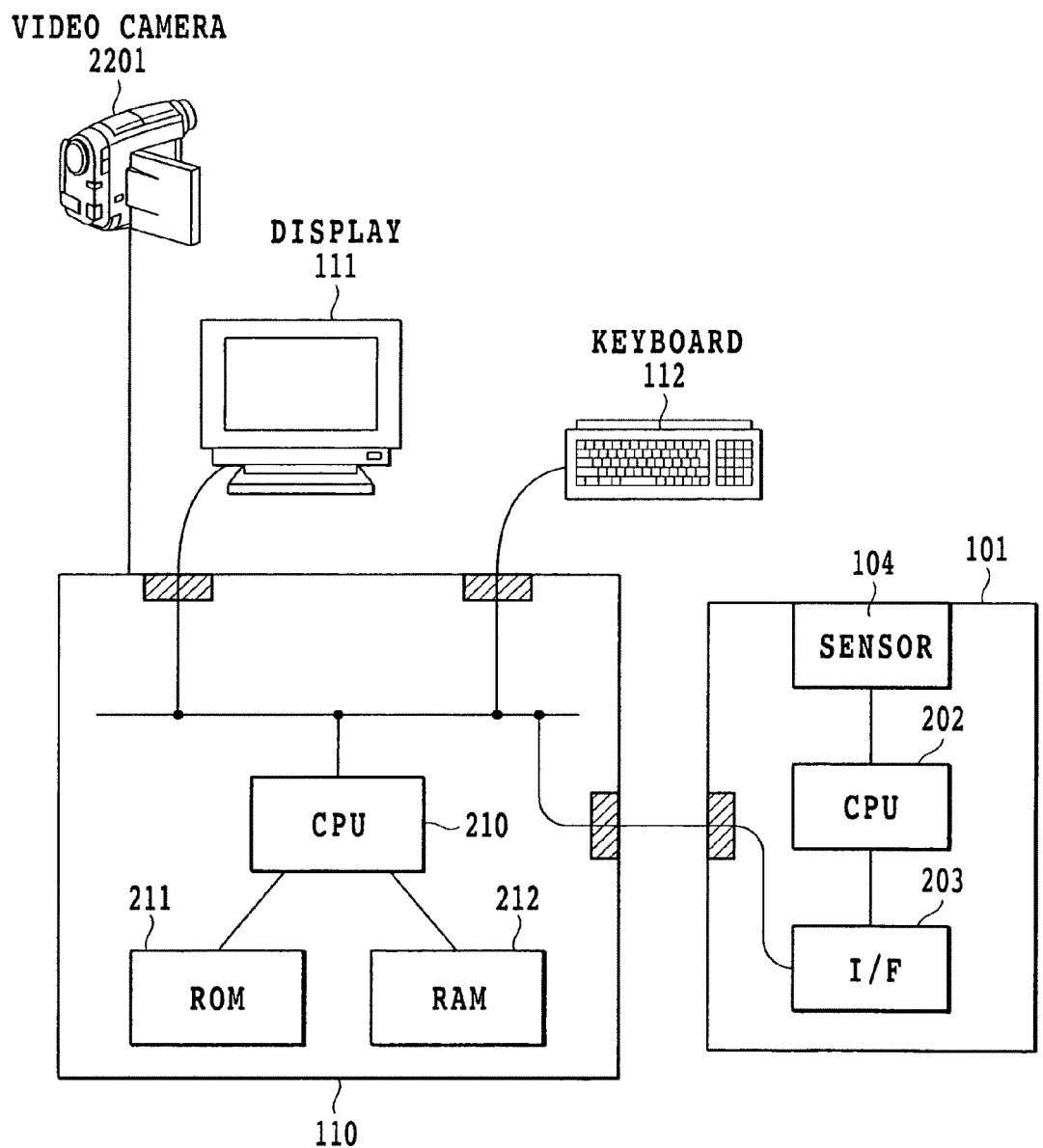
FIG. 22 is a schematic block diagram illustrating the arrangement of a data input apparatus 101 and a computer 110 according to one more embodiment of the present invention.

FIG. 22 is a schematic block diagram illustrating the configuration of a computer 110 for an image recognition apparatus according to this embodiment. A video camera 2201, for imaging an operator and markers provided for bars 102 and 103, is mounted on the top of a monitor, etc., and is connected to the computer 110, and the obtained images are transmitted to the computer 110. Based on the images received, a CPU 210 performs image extraction and positional calculation, which are the features of this embodiment, and employs the obtained position to determine whether a part of the body is extended across the operating surface toward the video camera 2201. Generally, the computer 110 includes the CPU 210, and executes, in a RAM 212, a program that is stored in a ROM 211, etc., and outputs, to a monitor, etc., the processing results obtained based on an image received from the image recognition apparatus. In this embodiment, mainly a variety of images provided by various applications that the operator experiences are output on the monitor; however, data used to support the entry of the operation is also displayed. For example, the correlation of a gesture with an operation is displayed as an image, or a movement that is identified as the current operation is displayed in real time as notification of the recognition state of the operator, so that during the processing the confidence of the operator is reinforced.

Referring to FIG. 22, for the operation input apparatus of this embodiment, a floor mat sensor 101 is extended across the obverse surface, and when pressure is applied by the operator, by stepping on an area identified by "L" or "R", for example, a signal corresponding to that portion is output. Since some operators may lose their balance while performing such a foot operation, the bar 102 is useful in this case because the operator can hold on to the bar and maintain a stable posture.

Furthermore, since markers are provided for the bar 101 on the side facing the video camera, the video camera 2201 obtains an image of the markers, together with the movements of the operator, and the computer 110 processes the obtained images, and employs the images as positional references to determine the meaning of the portion of the gesture of the operator that extends across the markers 101.

Figure 23:
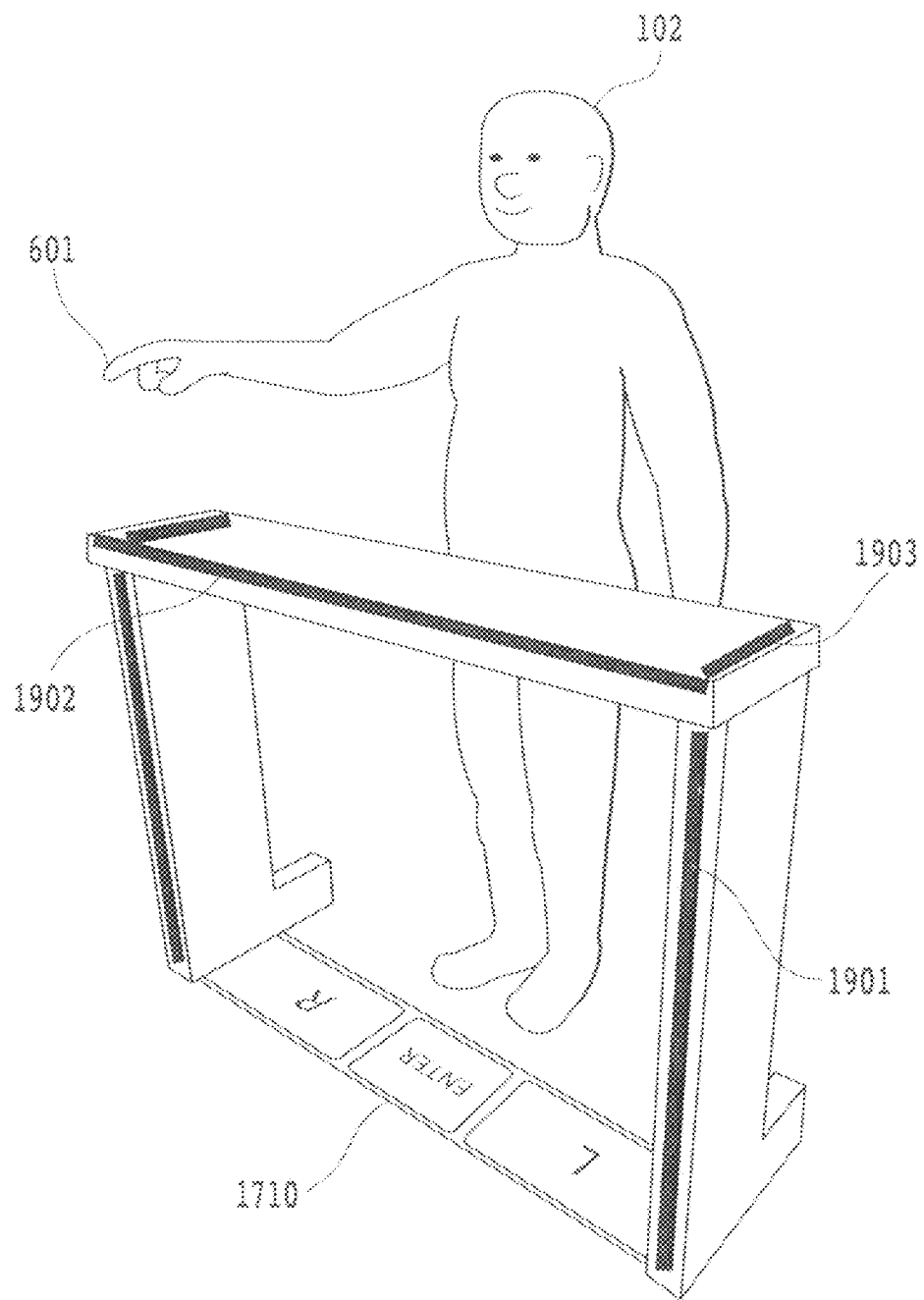
FIG. 23 is a diagram illustrating another example operating apparatus according to yet another embodiment of the present invention.

While the bars 102 and 103 are shown in FIG. 1, a three-dimensional object like a desk in FIG. 23, for example, may be employed. In this case, areas 105 identified by "R" and "L", which are selected using a foot, are arranged as well as shown in FIG. 1. The areas 105 identified by "R", etc., may be outlined in paint or printed on the surface of the floor mat or the floor, or a sheet may be adhered to the floor, for example. Or as in the other embodiments described above, LED spotlights or liquid crystal projectors may be mounted as projection means for projecting patterns, and the light projected on the floor mat sensor used to form an input character pattern, etc.

In this embodiment, the video camera 2201 is mounted on the top of the monitor 701 to obtain an image. However, imaging means is not limited to this, so long as a necessary image is obtained, and arbitrary imaging means, such as an infrared camera, known in the technical field of this invention, and an arbitrary mounting location near the monitor can be selected. In this embodiment, a three-dimensional (or 3D) camera is employed as the video camera 2201 to prepare a three-dimensional image that includes an operator and markers. Further, both an infrared camera and a video camera may be employed. That is, when a retroreflective material that will be described later, for example, is employed for markers, two types of cameras can be employed in the following manner: an infrared camera is employed, especially for calibration of a reference to form an operation screen, and an ordinary video camera is employed to obtain the movements of an operator.

In addition, an audio output device, such as a loudspeaker, is mounted on the system of this embodiment, and data related to the display contents and the operation can be aurally transmitted to the operator. When this function is provided, not only an image of the operating contents is presented on the display, but also the contents of an instruction and the processing results are released vocally, and the operating screen reference is identified. Thus, a visually impaired or blind operation can also be used to operate the system. Furthermore, the operator can employ the markers as the operation reference to maintain the operation screen above the markers.

The recognition process performed by an operator 2304 will be described more specifically while referring to FIG. 23. An image for markers 2301 to 2303 is extracted from images obtained by the video camera 2201 and is changed to monochrome binary data, and the number of pixels constituting the vertical and horizontal sides of the markers is calculated. The length and inclination of the vertical and horizontal sides of the obtained image are then compared with those of a reference image, and distortion and a scale in imaging space is obtained. In this embodiment, markers may be located at least four more locations to calculate a distortion and a scale. For example, when four or more reference points are present, a line segment can be formed by connecting these points and be employed for calibration.

As a result for this preparation, images of the operator 2304 and a hand 2305 are actually extracted, and the operator 2304, who is standing on the opposite side of the video camera 2201 across the markers of the operation input system, employs a correlation of the operator 2304 with the markers 2301 to 2303, and steps on the floor mat 101 to enter an operation start instruction. Then, it is determined that the operation has started, and the shape of the individual section (an open hand, two raised fingers, etc.,) or movement is examined to determine a predesignated operation consonant with the shape or the movement. In this case, the correlation of the shape or the movement with the operation can be determined independently by a system, or by an arbitrary method known to the technical field of this invention. The operation that is determined is performed by the computer 110 while the assumption is that the instruction for the operation was entered. The method for determining the operating content is not limited to the one described here, but an arbitrary method known to the technical field of this embodiment can be employed. Although a specific determination method has not been described, generally, the predesignated bodily configuration of the operator when performing a physical act, such as gesturing, or another movement, and the operating contents defined by such a configuration or movement are stored in a database, etc., and after an image has been extracted, the database is accessed to determine the operating content. At this time, the image recognition technology or artificial intelligence can also be used by employing a method known to the technical field of this invention to improve the accuracy of the determination.

As described above, the CPU 202 performs data processing for signals output by the floor mat sensor, i.e., converts signals into "R", or "L" data, and transmits the converted data to the computer 110 via the interface 203. The computer 110 identifies an operation input start based on data received from the floor mat sensor, recognizes the above described movement by examining an image obtained by the video camera 2201, and specifies an operation that the operator 2304 is going to perform. That is, assuming that the movement associated with stepping on "R" is a single operation, the operator 2304 needs to step on "R" only prior to the employment of a specific operation, and when the computer 110 is required to identify an operation, the operator steps on "R" while making a pre-designated gesture. As a result, the computer 110 can appropriately specify an operation for the system based on the movement of the operator.

INDUSTRIAL APPLICABILITY

Since the present invention includes foot movement limitation means, provided above a floor mat sensor to limit the movement of feet, and data output means, for receiving signals indicating feet have been placed on predetermined areas of a floor mat sensor and for outputting predesignated data in consonance with the pressure applied to predetermined areas, the movement of the feet is controlled, and predetermined positional references are provided for an operation. Therefore, when predesignated areas are actually manipulated, erroneous input events seldom occur without visual confirmation being required each time. Furthermore, since the floor mat sensor pattern can be variously changed in accordance with the content, this invention is useful for the dynamic preparation of content.

In addition, the present invention includes a reception step of receiving from the floor mat sensor, twice or more in succession, signals generated when the floor mat is stepped on, and an output step of outputting data, allocated in advance, in the reception order of signals that were received twice or more, and a combination of the signals. Therefore, when different data are to be output, based on locations on the floor mat sensor touched by the feet, the foot operations by multiple times are employed to specify and output a single set of data. As a result, erroneous entry events using the feet seldom occur.

The invention claimed is:

1. A data input apparatus that outputs data employing a floor mat sensor that generates different signals based on a position where a foot is placed, the data input apparatus comprising:
    foot movement limitation means, placed in a position so that there is a space between the foot movement limitation means and the floor mat sensor and configured to limit movement of a user's feet to a predetermined area of the floor mat sensor that is beyond the foot movement limitation means relative to the user; and
    data output means for outputting a signal generated by placing the user's foot within an area other than a movement limitation area by the process for identifying a position of a center of gravity of the user and outputting a signal generated by placing the user's foot within the movement limitation area by a different process from that of the signal generated by placing the user's foot within the area other than the movement limitation area, wherein the signal generated by placing the user's foot within the movement limitation area is outputted, while simultaneously, the user's other foot in an area other than the movement limitation area is not moved or holds steady.

2. The data input apparatus according to claim 1, wherein the foot movement limitation means defines the movement limitation area on the floor mat sensor that limits a movement of a body of the user; and when a foot is placed in the movement limitation area for which foot movement is limited, a pattern used to identify the areas for the output of the different signals is presented on the floor mat sensor.

3. The data input apparatus according to claim 2, further comprising:
    pattern change means for changing the pattern to identify the areas for the output of the different signals.

4. The data input apparatus according to claim 3, wherein the pattern change means includes identification pattern projection means for projecting, from above, on the floor mat sensor, the pattern used to identify the areas for the output of the different signals.

5. The data input apparatus according to claim 1, wherein the foot movement limitation means is a bar that is horizontally arranged at a predetermined height above the floor mat sensor.

6. The data input apparatus according to claim 1, further comprising:
    bar support means, for supporting the bar horizontally;
    wherein the identification pattern projection means is mounted on the bar support means.

7. The data input apparatus according to claim 1, wherein a boundary of the predetermined area is located near a position on the floor mat sensor where the horizontally arranged bar is projected.

8. The data input apparatus according to claim 1, wherein the predetermined height is an arbitrary position between a knee and a chest of a standard figure.

9. The data input apparatus according to claim 1, wherein the foot movement limitation means has a braille portion or a raised and a recessed portion to indicate the position of an input area designated on the floor mat sensor.

10. A data output method for outputting data by the data input apparatus according to claim 1, the method comprising:
    successively receiving, from the floor mat sensor, twice or more, a signal generated by applying a pressure using the foot; and
    outputting the data that is pre-allocated in correlation with a reception order and a combination of signals that were received twice or more.

11. The data output method according to claim 10, wherein when a signal indicating a data type has been received, and thereafter, a signal indicating data confirmation, which differs from the signal indicating the data type, is received, the data that was received as pre-allocated data and that is indicated by the data type is output as outputting data.

12. The data output method according to claim 11, wherein the floor mat sensor includes two or more data input areas for generating the signals indicating the different data types, and a confirmation area for generating the signal indicating the data confirmation.

13. The data output method according to claim 12, wherein the confirmation area is located between the two or more data input areas.

14. A data output apparatus, comprising:
a floor mat sensor for generating different signals based on different portions of the floor mat sensor being pressed by a foot;
receiving means for successively receiving, from the floor mat sensor, the different signals generated by applying a pressure using the foot; and
output means for outputting data that is pre-allocated in correlation with a reception order and a combination of signals that were received twice or more,
wherein:
 a data input apparatus comprising foot movement limitation means, placed in a position so that there is a space between the foot movement limitation means and the floor mat sensor and configured to limit movement of a user's feet to a predetermined area of the floor mat sensor that is beyond the foot movement limitation means relative to the user, and
 the output means outputs a signal generated by placing the user's foot within an area other than a movement limitation area defined by the foot movement limitation means by the process for identifying a position of a center of gravity of the user and outputs a signal generated by placing the user's foot within the movement limitation area by a different process from that of the signal generated by placing the user's foot within the area other than the movement limitation area, wherein the signal generated by placing the user's foot within the movement limitation area is outputted, while simultaneously, the user's other foot in an area other than the movement limitation area is not moved or holds steady.

15. The data output apparatus according to claim 14, wherein when the output means receives a signal indicating a data type and then receives a signal indicating data confirmation, which differs from the signal indicating the data type, the output means outputs the data that was received as pre-allocated data and that is indicated by the data type.

16. The data output apparatus according to claim 15, wherein the floor mat sensor includes two or more data input areas for generating the signals indicating the different data types, and a confirmation area for generating the signal indicating the data confirmation.

17. The data output apparatus according to claim 16, wherein the confirmation area is located between the two or more data input areas.

* * * * *